United States Patent
Sugiyama et al.

(10) Patent No.: US 10,953,779 B2
(45) Date of Patent: Mar. 23, 2021

(54) SEAT WITH ALERTNESS-MAINTAINING DEVICE

(71) Applicant: TS TECH CO., LTD., Asaka (JP)

(72) Inventors: Shinji Sugiyama, Tochigi (JP); Haruki Mochizuki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/558,563

(22) Filed: Sep. 3, 2019

(65) Prior Publication Data

US 2019/0389354 A1 Dec. 26, 2019

Related U.S. Application Data

(63) Continuation of application No. 15/108,037, filed as application No. PCT/JP2014/084667 on Dec. 26, 2014, now Pat. No. 10,434,916.

(30) Foreign Application Priority Data

Dec. 27, 2013 (JP) .................................. 2013-272374

(51) Int. Cl.
- *B60N 2/90* (2018.01)
- *B60N 2/68* (2006.01)
(Continued)

(52) U.S. Cl.
CPC .................. *B60N 2/90* (2018.02); *A47C 7/72* (2013.01); *B60N 2/68* (2013.01); *B60N 2/7094* (2013.01); *B60N 2002/981* (2018.02)

(58) Field of Classification Search
None
See application file for complete search history.

(56) References Cited

U.S. PATENT DOCUMENTS

| | | |
|---|---|---|
| 3,009,676 A | 11/1961 | Buchwald |
| 3,934,283 A | 1/1976 | Raffel |
| (Continued) | | |

FOREIGN PATENT DOCUMENTS

| | | |
|---|---|---|
| JP | S55-89357 U | 6/1980 |
| JP | H01-130722 U | 9/1989 |
| (Continued) | | |

OTHER PUBLICATIONS

Office Action issued in related application JP 2015-555067, dated Nov. 13, 2018, with machine generated English language translation, 8 pages.

*Primary Examiner* — David E Allred
(74) *Attorney, Agent, or Firm* — Faegre Drinker Biddle & Reath LLP

(57) ABSTRACT

A seat with an alertness-maintaining device that can efficiently secure a drive source (for example, a motor) when the drive source is internally housed and a vibratory stimulus is imparted to the occupant. The present disclosure relates to a seat with an alertness-maintaining device, the seat being provided with an alertness-maintaining device for imparting physical force to the occupant to promote alertness. A load-supporting portion for supporting the load on the back of the occupant is installed, and a device drive unit for imparting physical force to the occupant, the device drive unit that forms the alertness-maintaining device, is attached to the load-supporting portion. The device drive unit is provided with a drive source and a support member. The support member is attached to the load-supporting portion while grasping a part of the load-supporting portion by a drive source attachment surface portion and a load-supporting portion-clamping piece.

9 Claims, 23 Drawing Sheets

(51) Int. Cl.
*B60N 2/70* (2006.01)
*A47C 7/72* (2006.01)

(56) References Cited

U.S. PATENT DOCUMENTS

| | | | |
|---|---|---|---|
| 5,176,424 A * | 1/1993 | Tobita | A47C 27/082 297/284.1 |
| 6,058,341 A * | 5/2000 | Myers | B60N 2/002 701/45 |
| 6,402,240 B1 * | 6/2002 | Toba | B60N 2/002 297/217.3 |
| 6,431,646 B1 | 8/2002 | Longoria | |
| 6,476,514 B1 * | 11/2002 | Schondorf | B60R 21/01516 180/271 |
| 6,545,463 B1 * | 4/2003 | Dettmann | G01D 5/145 324/207.21 |
| 6,669,291 B1 | 12/2003 | Hsiao | |
| 7,681,949 B2 | 3/2010 | Nathan et al. | |
| 7,714,701 B2 | 5/2010 | Altan et al. | |
| 7,997,656 B2 * | 8/2011 | Inagaki | B60N 2/0224 297/217.3 |
| 8,269,614 B2 | 9/2012 | Kerstan et al. | |
| 9,022,160 B2 * | 5/2015 | Smith | B60K 28/04 180/273 |
| 9,039,081 B2 * | 5/2015 | Arefi | B60N 2/686 297/188.12 |
| 9,286,773 B2 | 3/2016 | McQueen et al. | |
| 9,421,908 B2 | 8/2016 | McQueen et al. | |
| 9,452,697 B2 | 9/2016 | Okubo et al. | |
| 9,649,962 B2 | 5/2017 | Line et al. | |
| 9,676,311 B2 | 6/2017 | Murolo et al. | |
| 9,694,723 B2 | 7/2017 | Shimizu | |
| 9,725,036 B1 | 8/2017 | Tarte | |
| 9,746,048 B2 | 8/2017 | Okubo | |
| 9,878,680 B2 | 1/2018 | Mita | |
| 10,232,740 B1 * | 3/2019 | Jaradi | B60N 2/0232 |
| 2002/0145512 A1 | 10/2002 | Sleichter, III et al. | |
| 2005/0090958 A1 * | 4/2005 | Hattori | B60N 2/002 701/45 |
| 2005/0171458 A1 | 8/2005 | Luden et al. | |
| 2006/0109091 A1 * | 5/2006 | Rittmueller | B60N 2/002 340/426.26 |
| 2007/0210903 A1 | 9/2007 | Lefranc | |
| 2007/0241895 A1 * | 10/2007 | Morgan | B60N 2/002 340/561 |
| 2010/0207773 A1 * | 8/2010 | Hayakawa | B60N 2/002 340/667 |
| 2013/0076090 A1 | 3/2013 | Kim | |
| 2014/0008948 A1 | 1/2014 | Rockwell et al. | |
| 2014/0197942 A1 * | 7/2014 | Tabaczynski | B60N 2/002 340/457.1 |
| 2015/0096810 A1 * | 4/2015 | Honda | G01G 23/002 177/1 |
| 2015/0232009 A1 | 8/2015 | Jamieson et al. | |
| 2015/0246627 A1 | 9/2015 | Shimizu | |
| 2017/0267133 A1 | 9/2017 | Shimizu | |
| 2017/0282753 A1 * | 10/2017 | Zouzal | B60N 2/995 |
| 2018/0022233 A1 * | 1/2018 | Maguire | B60R 21/015 701/46 |
| 2019/0038229 A1 * | 2/2019 | Perraut | A61F 7/007 |
| 2020/0062156 A1 * | 2/2020 | Little | B60N 2/0248 |

FOREIGN PATENT DOCUMENTS

| | | |
|---|---|---|
| JP | H05-330360 A | 12/1993 |
| JP | H11-078591 A | 3/1999 |
| JP | 2009-255809 A | 11/2009 |
| JP | 2009-297408 A | 12/2009 |
| JP | 2010-177112 A | 8/2010 |
| JP | 2013-188435 A | 9/2013 |
| WO | 2014/054553 A1 | 4/2014 |

\* cited by examiner

SEAT WITH ALERTNESS-MAINTAINING DEVICE

CROSS REFERENCE TO RELATED APPLICATIONS

This application is a continuation application of U.S. patent application Ser. No. 15/108,037, filed Jun. 24, 2016, now U.S. Pat. No. 10,434,916, which is the National Stage Entry application of PCT Application No. PCT/JP2014/084667, filed Dec. 26, 2014, which claims the priority benefit of Japanese Patent Application No. 2013-272374, filed Dec. 27, 2013, the contents being incorporated herein by reference.

BACKGROUND

The present disclosure relates to a seat with an alertness-maintaining device, and particularly to a seat provided with an alertness-maintaining device that imparts a stimulus to the occupant of the seat. Seats in which a vibration motor for imparting vibrations to the occupant, or the like, is housed are commonly known. For example, Japanese Patent Publication JP H05-330360 A discloses a device, in which a vehicle seat is selected as a seat, for allowing the seat to vibrate at a frequency in such a range as not to give discomfort to the occupant. Then, the frequency is specifically set to 40 Hz to 50 Hz. Moreover, Japanese Patent Publication JP H11-78591 A also discloses a device, in which a vehicle seat is selected as a seat, for imparting, for example, a vibratory stimulus having an intensity depending on the sensitivity of the occupant to the occupant by a vibration motor.

Thus, various techniques for imparting vibrations to the occupant have been proposed. Note that, to impart a vibratory stimulus to the occupant using a motor, the motor is required to be housed in a seat. In housing a drive source, such as this motor, supporting a vibration device in an effective and stable manner has been desired.

SUMMARY

The present disclosure has been made in view of the above-mentioned problems, and at least some embodiments of the present disclosure provide a seat with an alertness-maintaining device that can efficiently secure a drive source (for example, a motor) when the drive source is internally housed and a vibratory stimulus is imparted to the occupant.

The problem as described above is solved by a seat with an alertness-maintaining device of an embodiment of the present disclosure, the seat being formed by connecting a back part supporting the back of an occupant and a seat part serving as a seating surface for the occupant and supporting the load. The seat includes the alertness-maintaining device for imparting physical force to the occupant to promote alertness. At the back part, a load-supporting portion made of a resin for supporting the load on the back of the occupant is placed, a device drive unit that forms the alertness-maintaining device is attached to the load-supporting portion and imparts physical force to the occupant. The device drive unit includes a drive source generating physical force and a support member attached to the load-supporting portion while supporting the drive source. The support member includes a drive source attachment surface portion that is an attachment part of the drive source and a load-supporting portion-clamping piece extending from the drive source attachment surface portion and opposed to the drive source attachment surface portion. The support member is attached to the load-supporting portion while grasping a part of the load-supporting portion by the drive source attachment surface portion and the load-supporting portion-clamping piece.

Thus, according to the present disclosure, a part of the load-supporting portion made of a resin is clamped by the drive source attachment surface portion and the load-supporting portion-clamping piece that form the support member, whereby the support member can be attached to the load-supporting portion. This configuration allows the support member to be attached to the load-supporting portion made of a resin efficiently and securely. Moreover, on this occasion, favorably, in contrast to the load-supporting portion is made of a resin, the support member is configured to be made of a metal. Thus, reduction of weight can be sought because the load-supporting portion is made of a resin, while the drive source can be stably attached by the support member made of a metal.

Moreover, in an embodiment, the drive source attachment surface portion, the load-supporting portion-clamping piece, and a part of the load-supporting portion that is clamped by both are fastened together by a shoulder bolt, and a part of the load-supporting portion made of a resin is supported by a shoulder at a proximal side of a leg of the shoulder bolt.

As thus configured, using the shoulder bolt, deformation of a resin part is restrained while fastening can be securely performed.

Further, in an embodiment, the support member is attached to a lower end of the load-supporting portion, the drive source attachment surface portion is attached on a back surface side of the load-supporting portion, the load-supporting portion-clamping piece is configured to pass below the pressure-receiving member from a lower end side of the drive source attachment surface portion and come around to a front surface of the pressure-receiving member, and a part of the load-supporting portion is clamped by the drive source attachment surface portion on the back surface side of the load-supporting portion and the load-supporting portion-clamping piece coming around to a front surface side of the load-supporting portion.

Moreover, as another example configuration, the support member is attached to a center portion of the load-supporting portion, the drive source attachment surface portion is attached on a back surface side of the load-supporting portion, in the load-supporting portion, a through hole penetrating front and back surfaces is formed at a lower side of, or sideways from, a placement portion of the support member, the load-supporting portion-clamping piece is configured to pass through the through hole from a lower end side of the drive source attachment surface portion and come around to a front surface of the load-supporting portion, and a part of the load-supporting portion is clamped by the drive source attachment surface portion on the back surface side of the load-supporting portion and the load-supporting portion-clamping piece coming around to a front surface side of the load-supporting portion.

As thus configured, the configuration in which the load-supporting portion is easily clamped by the drive source attachment surface portion and the load-supporting portion-clamping piece can be achieved. In other words, when the support member is placed at a lower part of the load-supporting portion, the load-supporting portion-clamping piece can be allowed to come around to the front surface side from the lower end portion, and when the support member is placed at the center of the load-supporting portion, the load-supporting portion-clamping piece can be allowed to come around to the front surface side through the through hole formed at a lower part or a side part of the load-supporting portion. This configuration allows the support member (and the drive source mounted thereon) to be attached to the load-supporting portion efficiently.

Moreover, if the drive source is a vibration motor having an unbalanced mass, the motor is covered by a motor case, a coupler connected to the motor is attached to the motor case, and the motor case on which the motor and the coupler are mounted is attached to a back side of the support member, the motor is protected by the motor case and other necessary components can be mounted on the motor case to form a unit. Accordingly, as thus configured, the drive source (the motor) can be attached efficiently (through the support member).

Further, in an embodiment, at the motor case, a terminal electrically connected to the motor is placed and a coupler placement portion at which the coupler is placed is formed, a free end of the terminal is placed at the coupler placement portion, and the coupler is placed at the coupler placement portion, whereby the free end of the terminal and the coupler are electrically connected.

As thus configured, in addition to the effects as described above, the coupler can be attached to the drive source (the motor) by one touch, so that the drive source (the motor) can be attached further efficiently (through the support member).

In addition, further, the alertness-maintaining device that forms the seat with the alertness-maintaining device according to the present disclosure includes the device drive unit, a control device for performing a drive control of the device drive unit, and an electrical connection wire that electrically connects the device drive unit and the control device. Accordingly, control of the device drive unit by the control device (for example, ECU: Electrical Control Unit) is enabled.

According to the present disclosure, a part of the load-supporting portion made of a resin is clamped by the drive source attachment surface portion and the load-supporting portion-clamping piece that form the support member, enabling combining components of different materials (the support member and the load-supporting portion). Accordingly, the drive source mounted on the support member can be efficiently attached to the load-supporting portion. According to the present disclosure, reduction of weight can be sought, while the drive source can be stably attached. According to the present disclosure, deformation of a resin part is reduced while fastening can be securely performed. According to the present disclosure, the support member (and the drive source mounted thereon) can be efficiently attached to the load-supporting portion. According to the present disclosure, the motor is protected by the motor case, and the drive source (the motor) can be attached efficiently (through the support member). According to the present disclosure, the drive source (the motor) can be attached further efficiently (through the support member). According to the present disclosure, control of the device drive unit by the control device is enabled.

BRIEF DESCRIPTION OF DRAWINGS

Various embodiments of the invention are illustrated in the drawings, in which.

DETAILED DESCRIPTION

Hereinafter, a vehicle seat S with an alertness-maintaining device (hereinafter, simply referred to as "vehicle seat S") according to an embodiment of the present disclosure is described with reference to FIGS. 1-9. Hereinafter, as an example of a placement portion of a device drive unit 5 that forms an alertness-maintaining device U, a case in which application is made to a seat back is described, to which, however, the placement portion of the device drive unit 5 is not limited but may be a seat cushion, and may be modified as appropriate.

Figure 1:
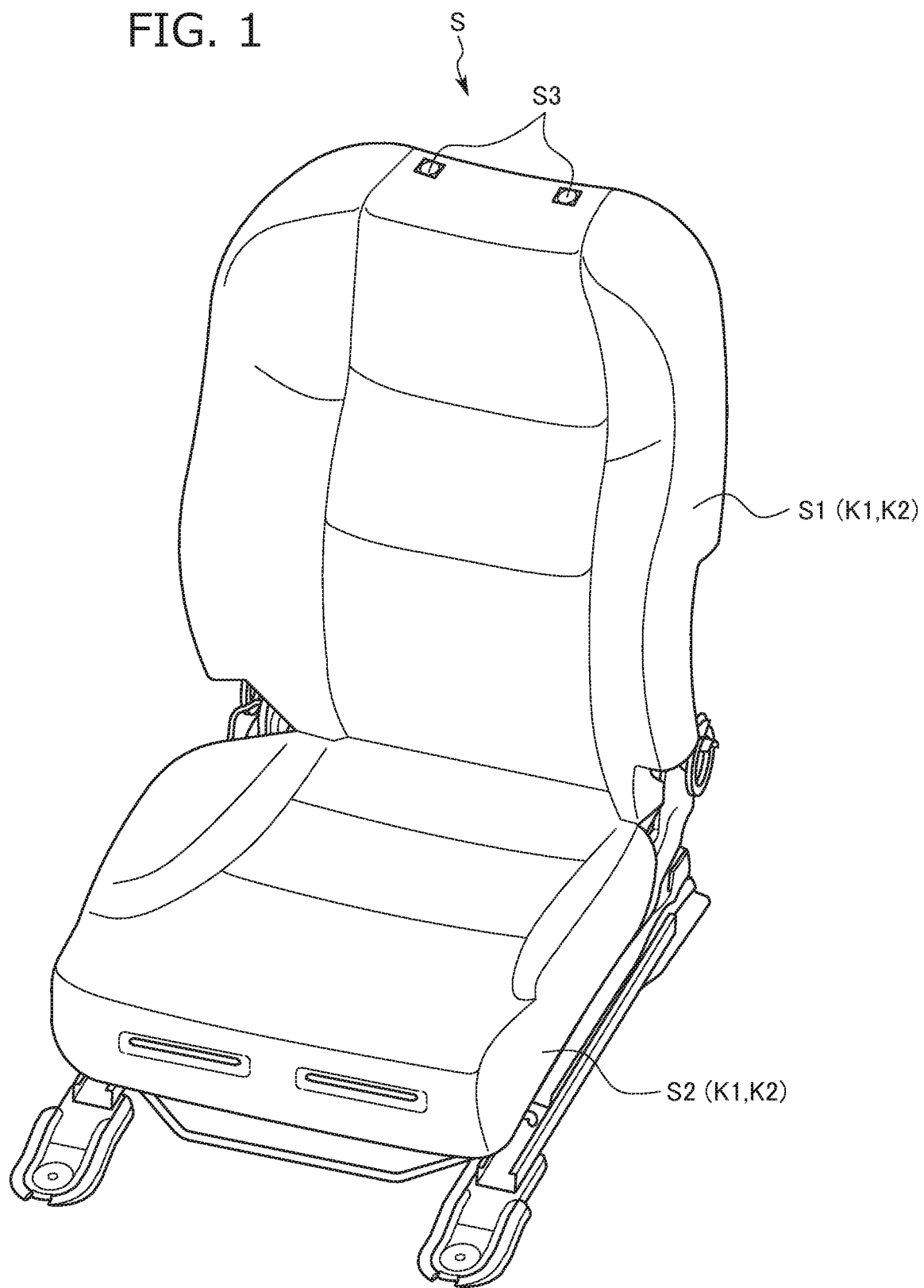
FIG. 1 is an external view of a vehicle seat with an alertness-maintaining device according to a first embodiment of the present disclosure.
Figure 2:
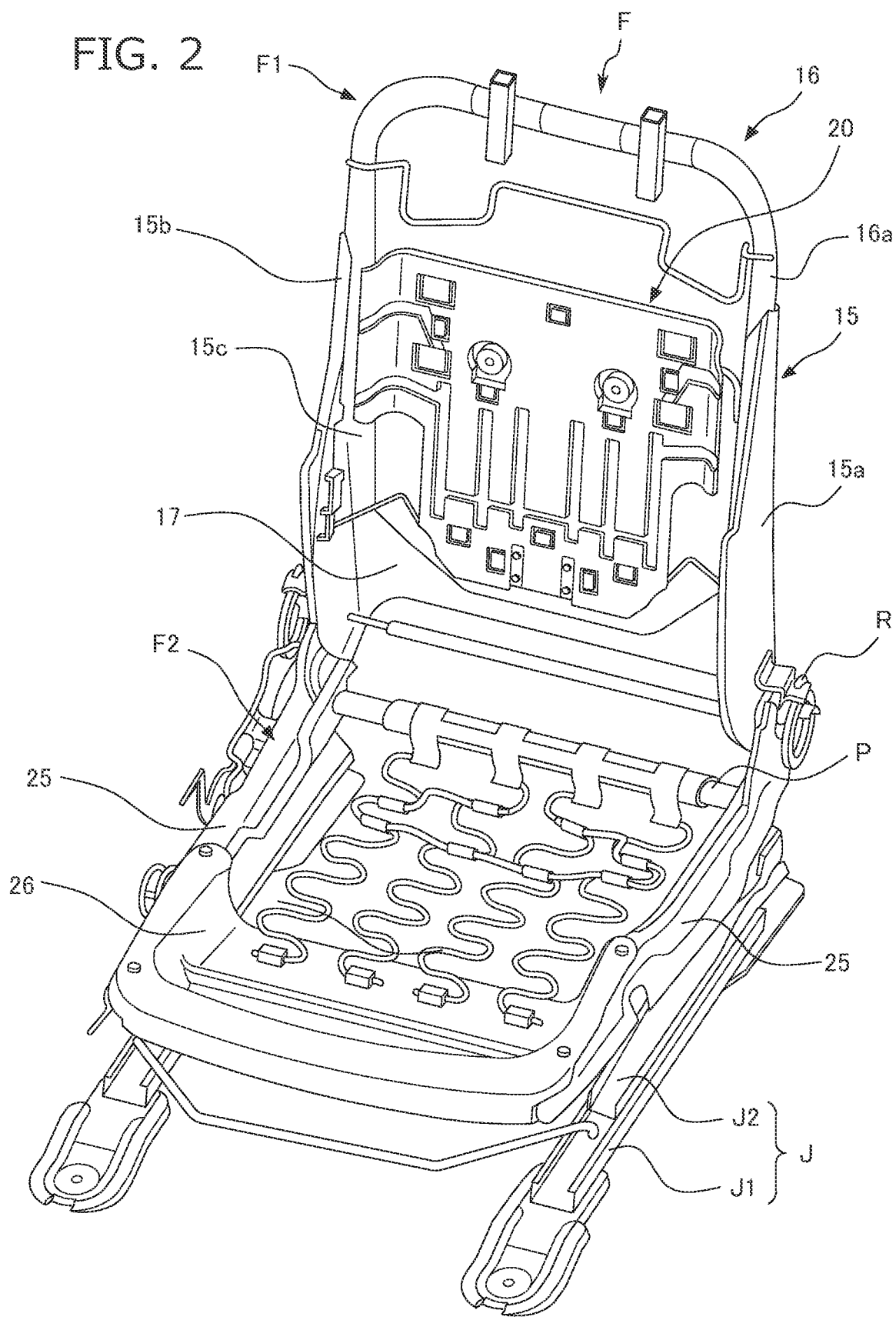
FIG. 2 is a perspective view of a seat frame according to the first embodiment of the present disclosure.
Figure 3:
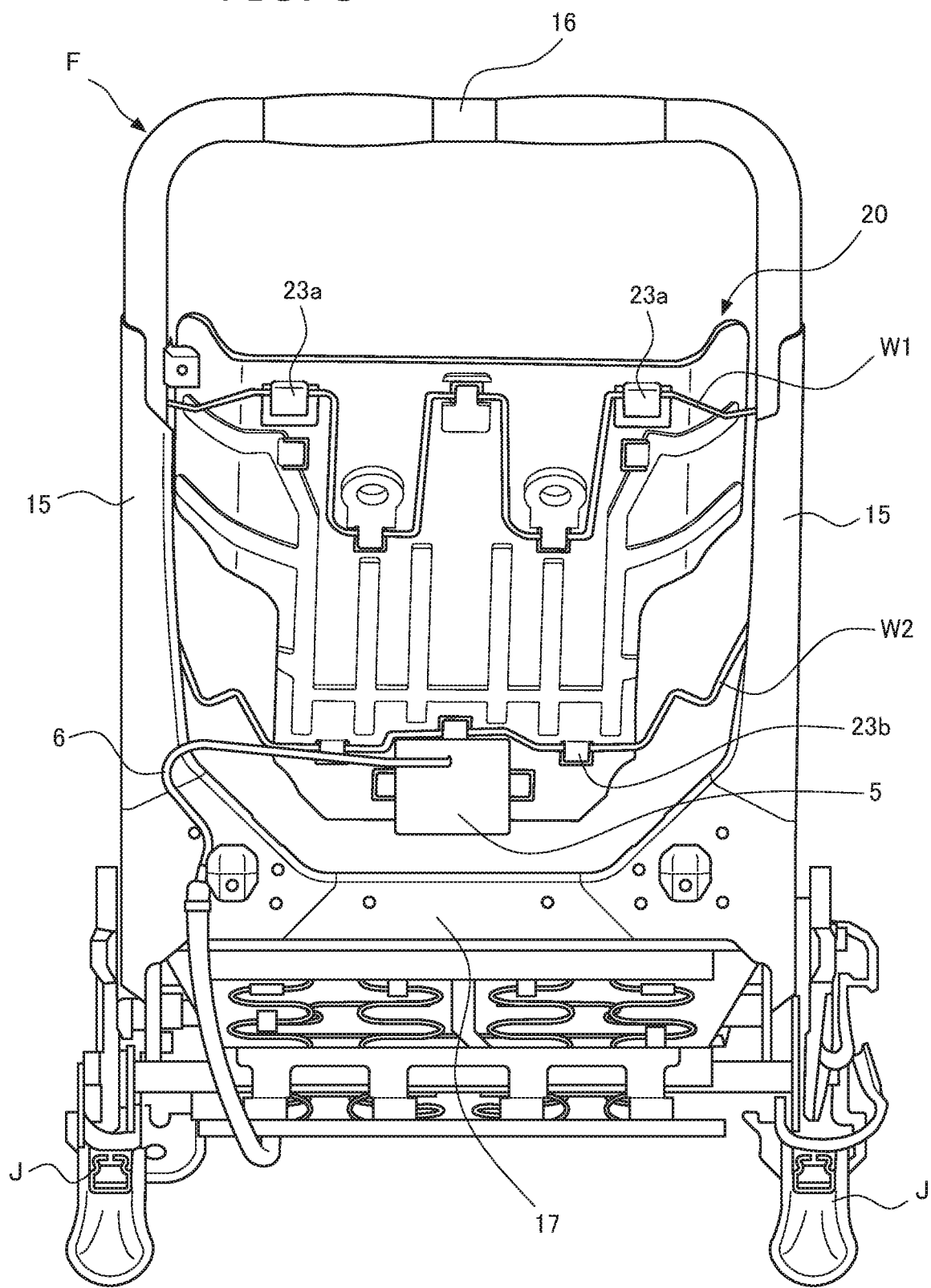
FIG. 3 is a rear view of a seat back frame according to the first embodiment of the present disclosure.
Figure 4A:
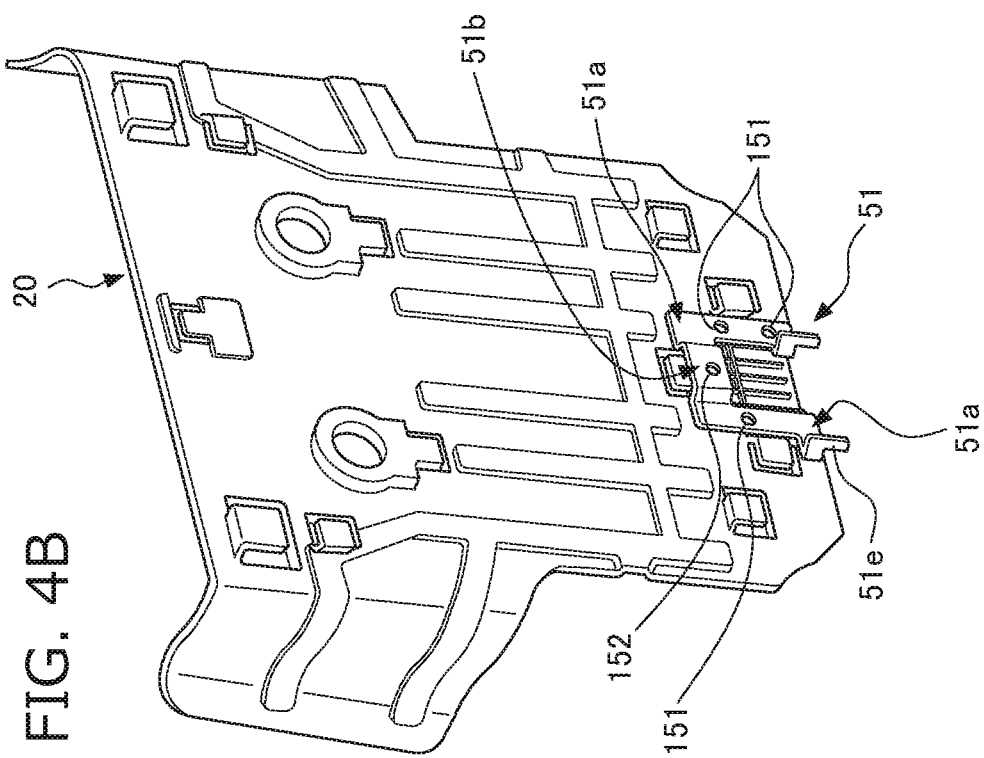
FIGS. 4A and 4B are illustrative diagrams of a state of attachment of a support bracket that forms the alertness-maintaining device according to the first embodiment of the present disclosure.
Figure 4B:
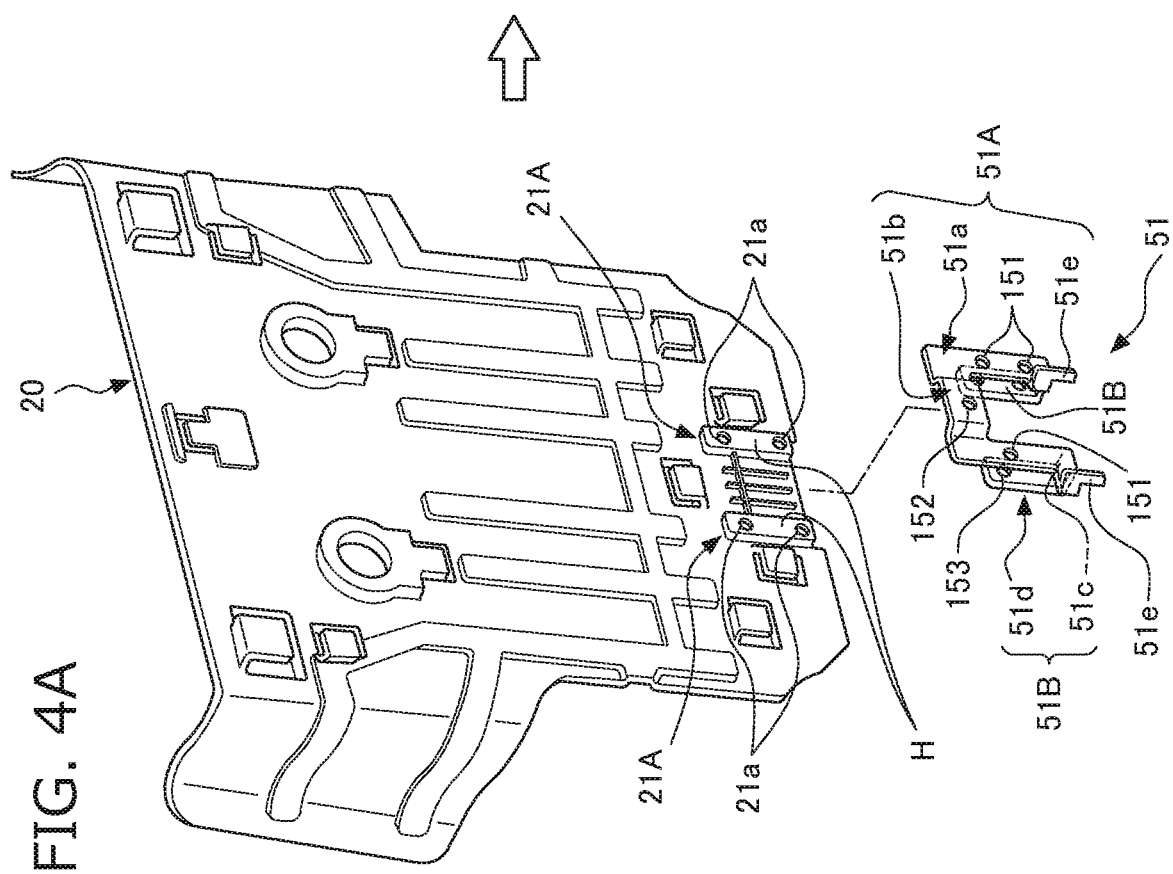
Figure 5:
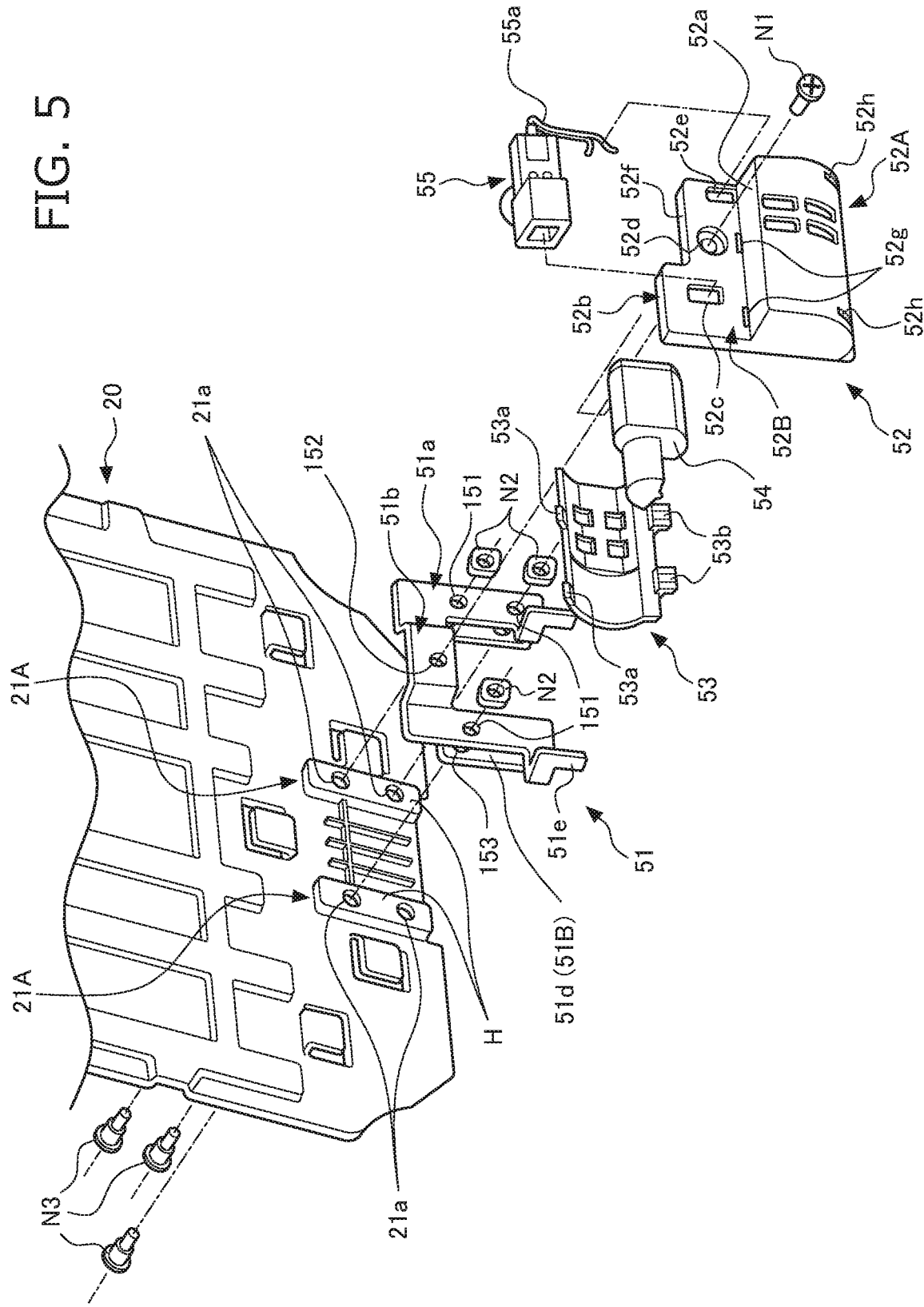
FIG. 5 is an exploded view of attachment of a device drive unit that forms the alertness-maintaining device according to the first embodiment of the present disclosure.
Figure 6:
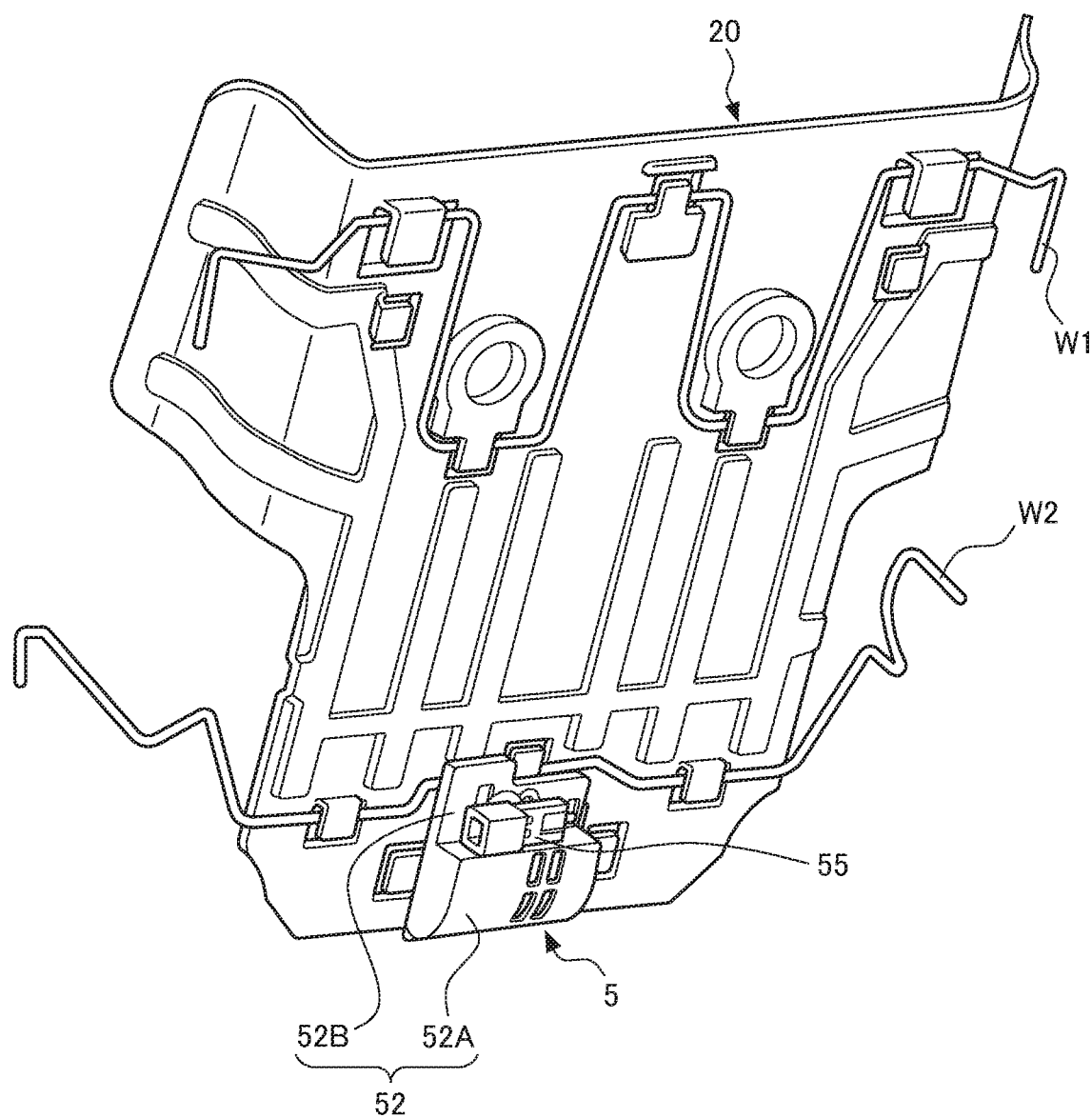
FIG. 6 is a perspective view of a pressure-receiving member on which the device drive unit is mounted according to the first embodiment of the present disclosure.
Figure 7:
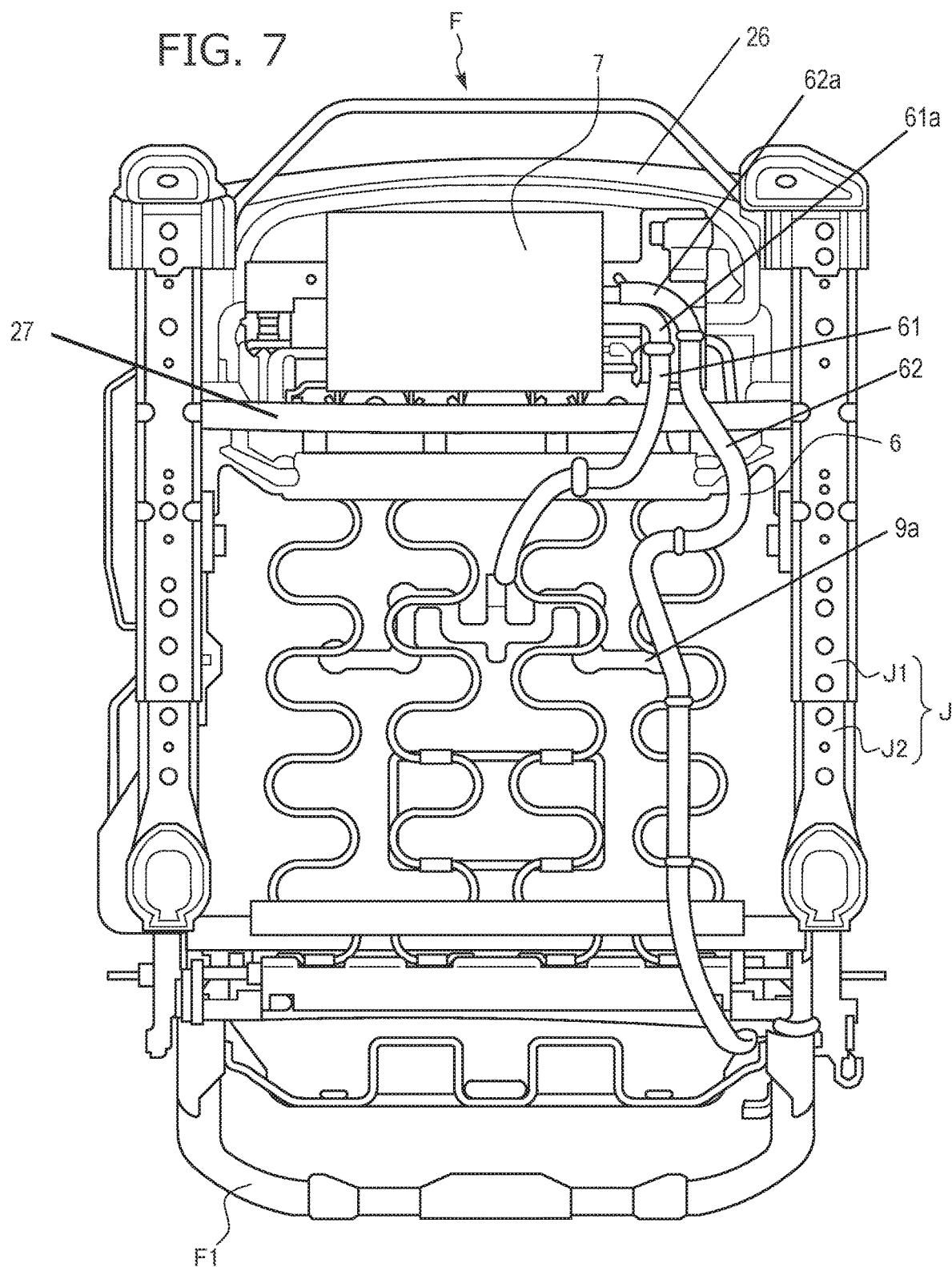
FIG. 7 is a bottom view of the seat back frame according to the first embodiment of the present disclosure.
Figure 8:
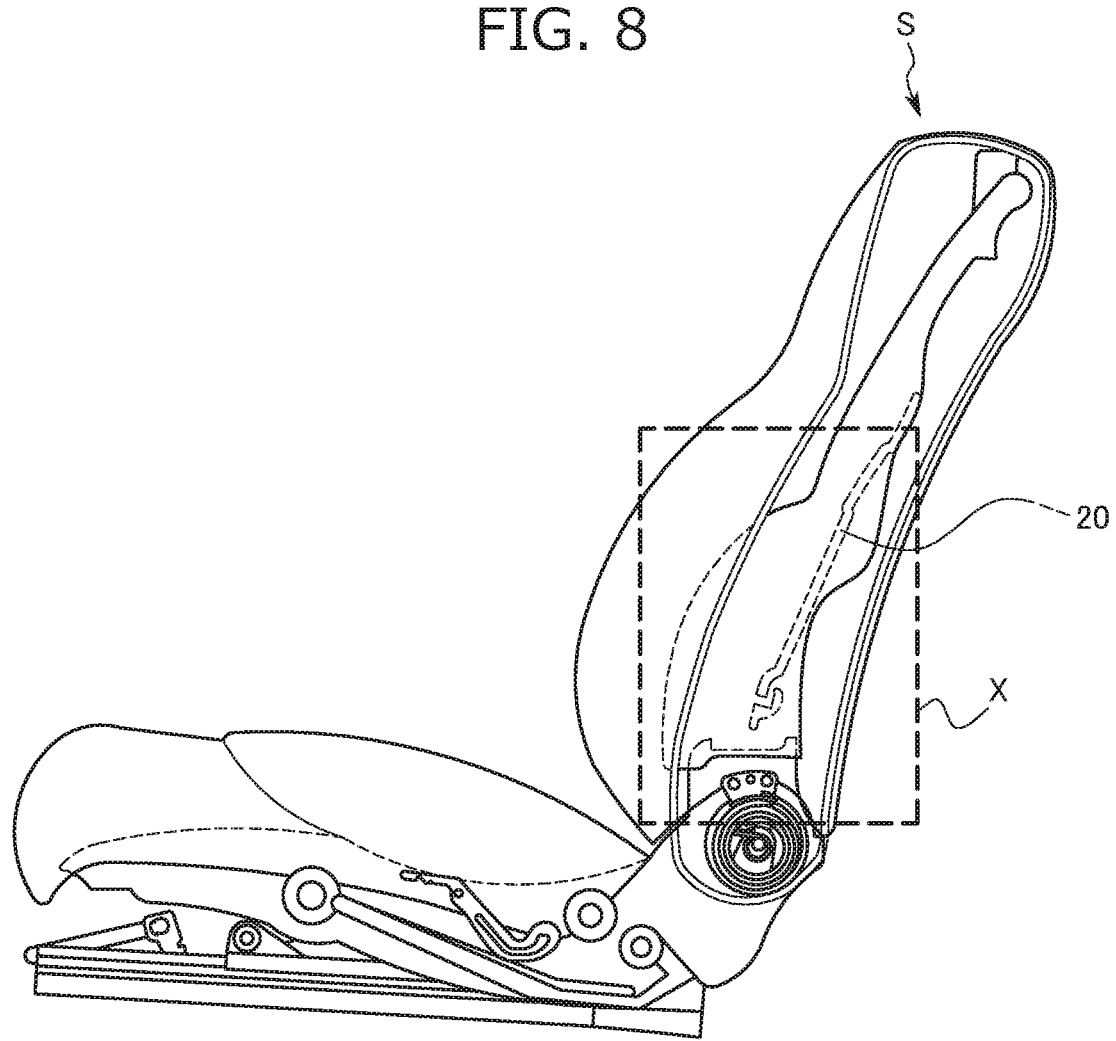
FIG. 8 is an illustrative diagram illustrating an attachment position of the device drive unit and effects thereof according to the first embodiment of the present disclosure.
Figure 9:
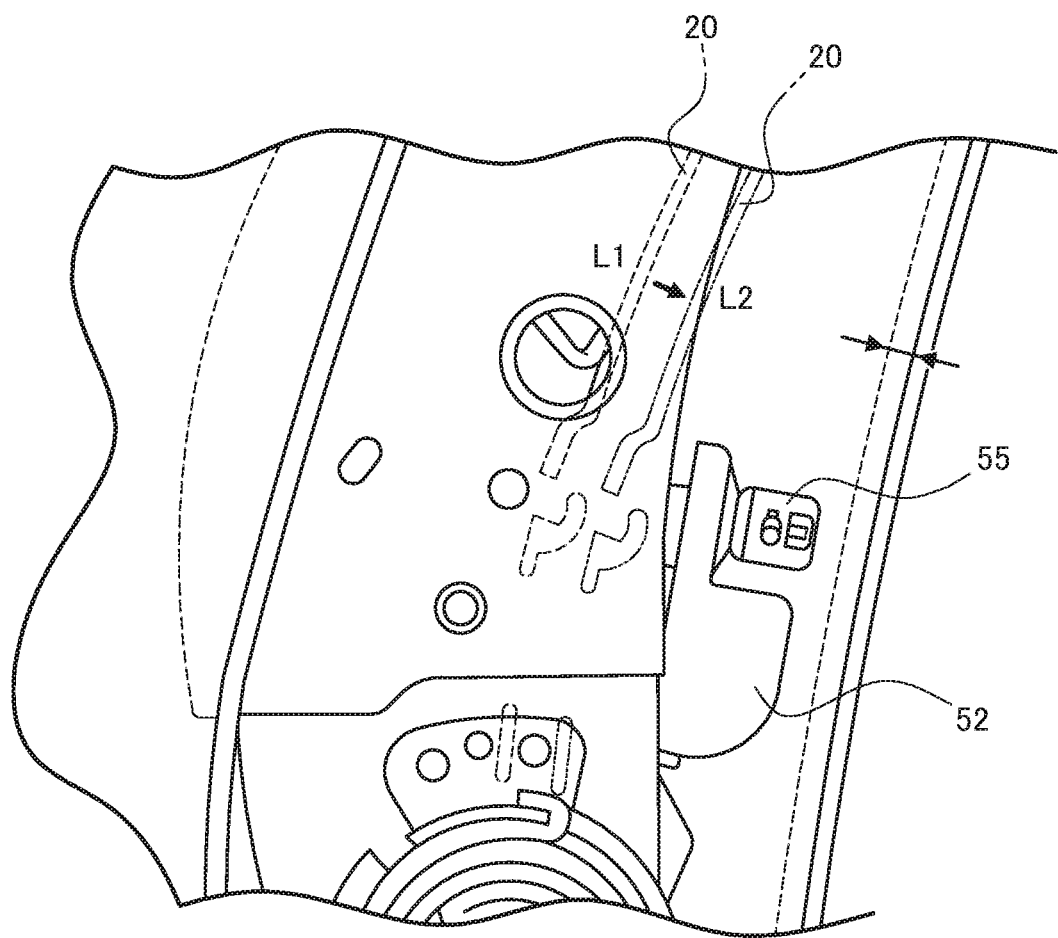
FIG. 9 is an enlarged view of an X portion of FIG. 8.
Figure 10:
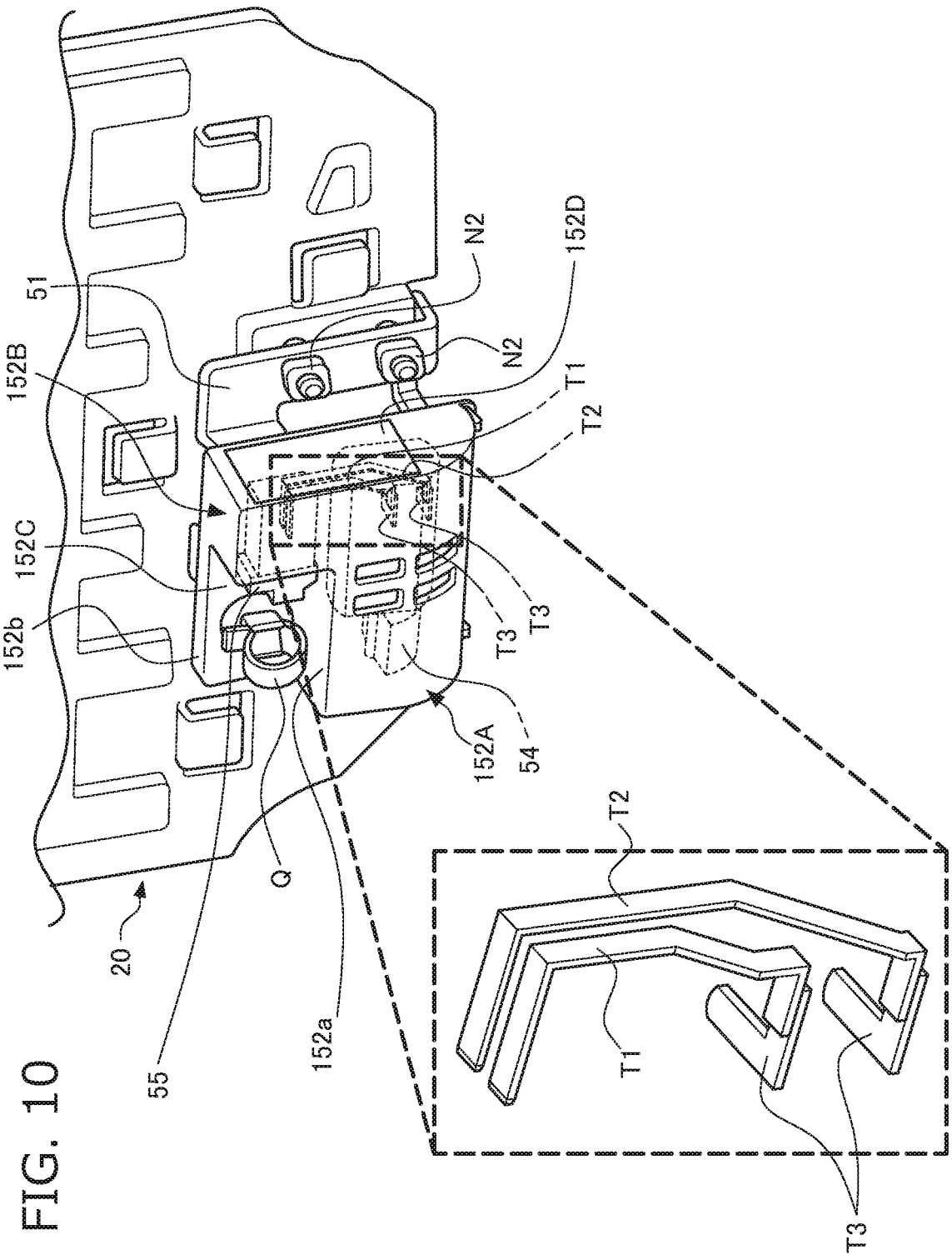
FIG. 10 is an illustrative perspective view of the alertness-maintaining device according to a second embodiment of the present disclosure.
Figure 11A:
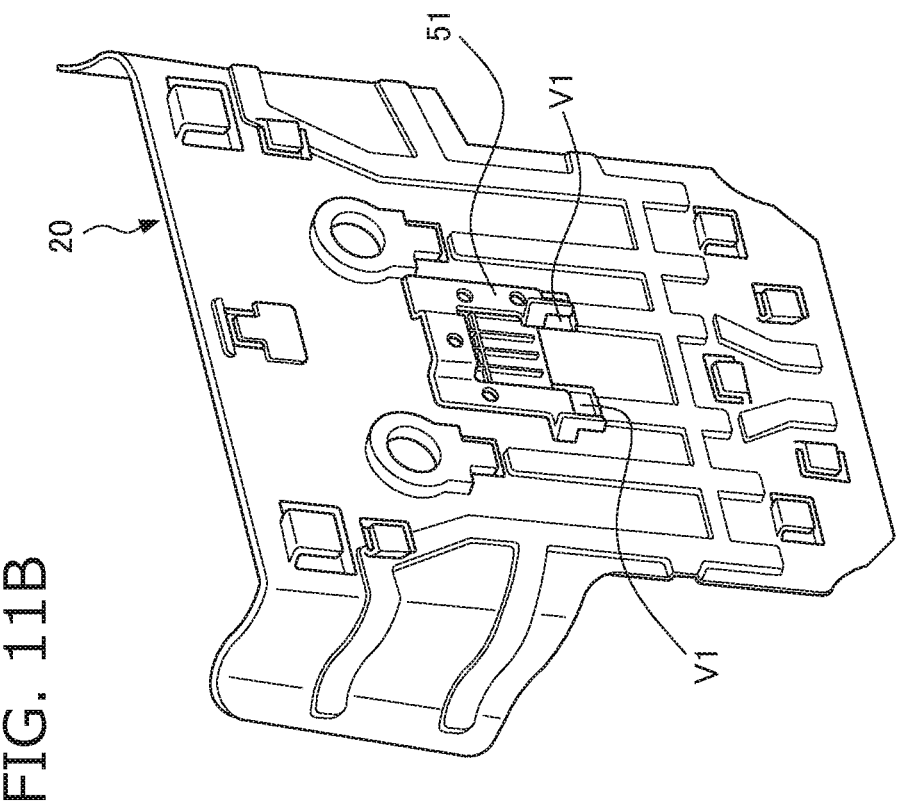
FIGS. 11A and 11B are illustrative diagrams illustrating an attachment position of the support bracket according to a modified example of the first and second embodiments of the present disclosure.
Figure 11B:
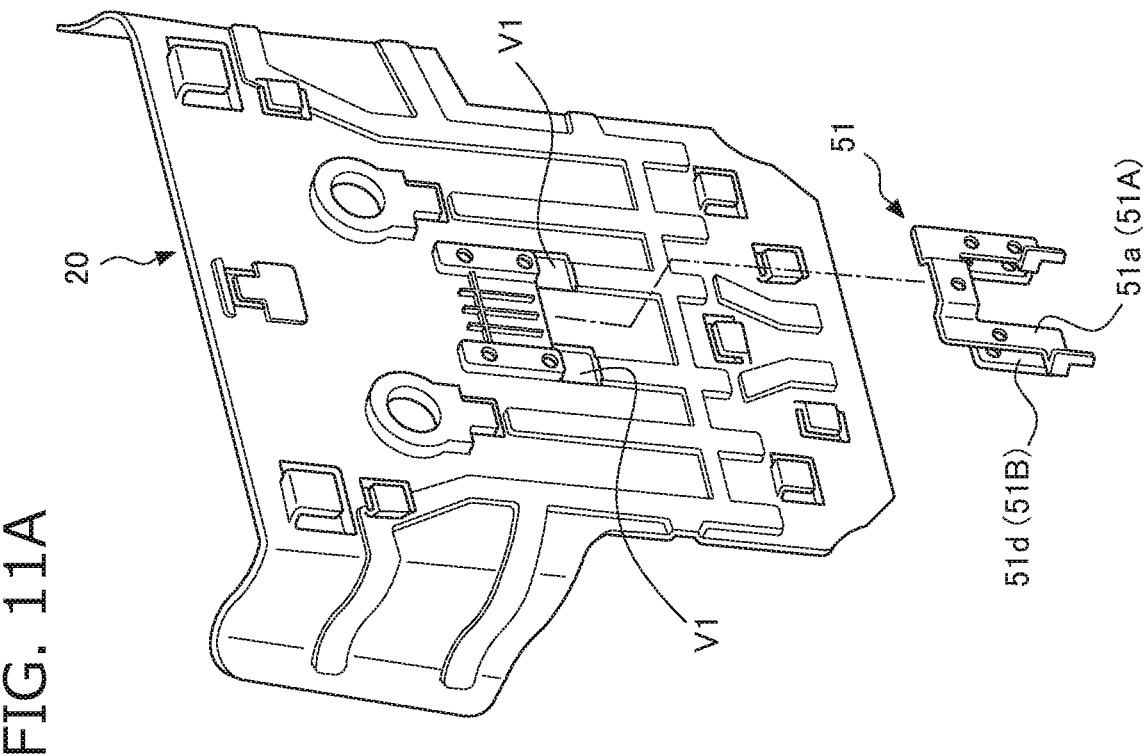
Figure 12:
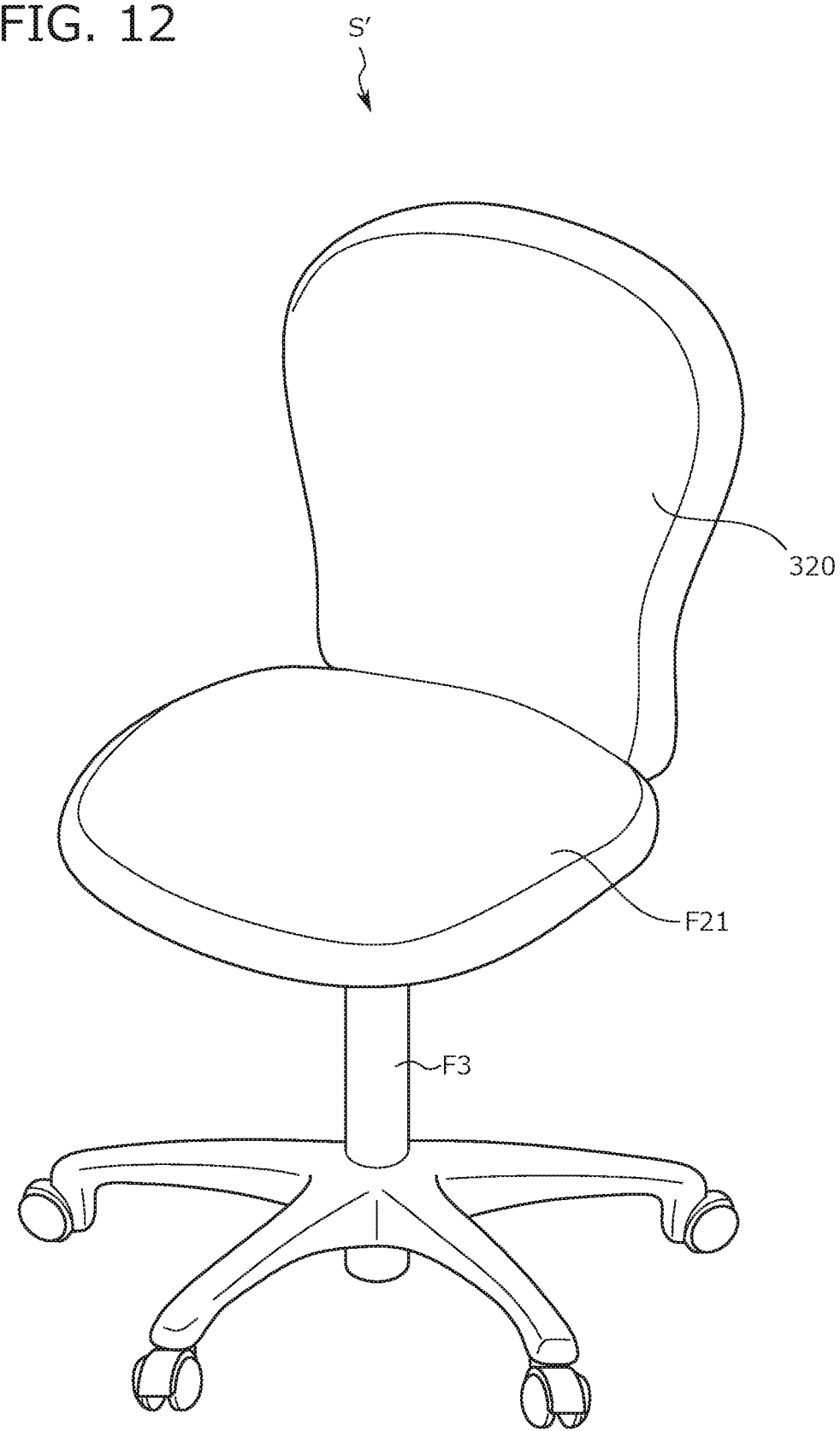
FIG. 12 is an external view of an office chair according to a third embodiment of the present disclosure.
Figure 13:
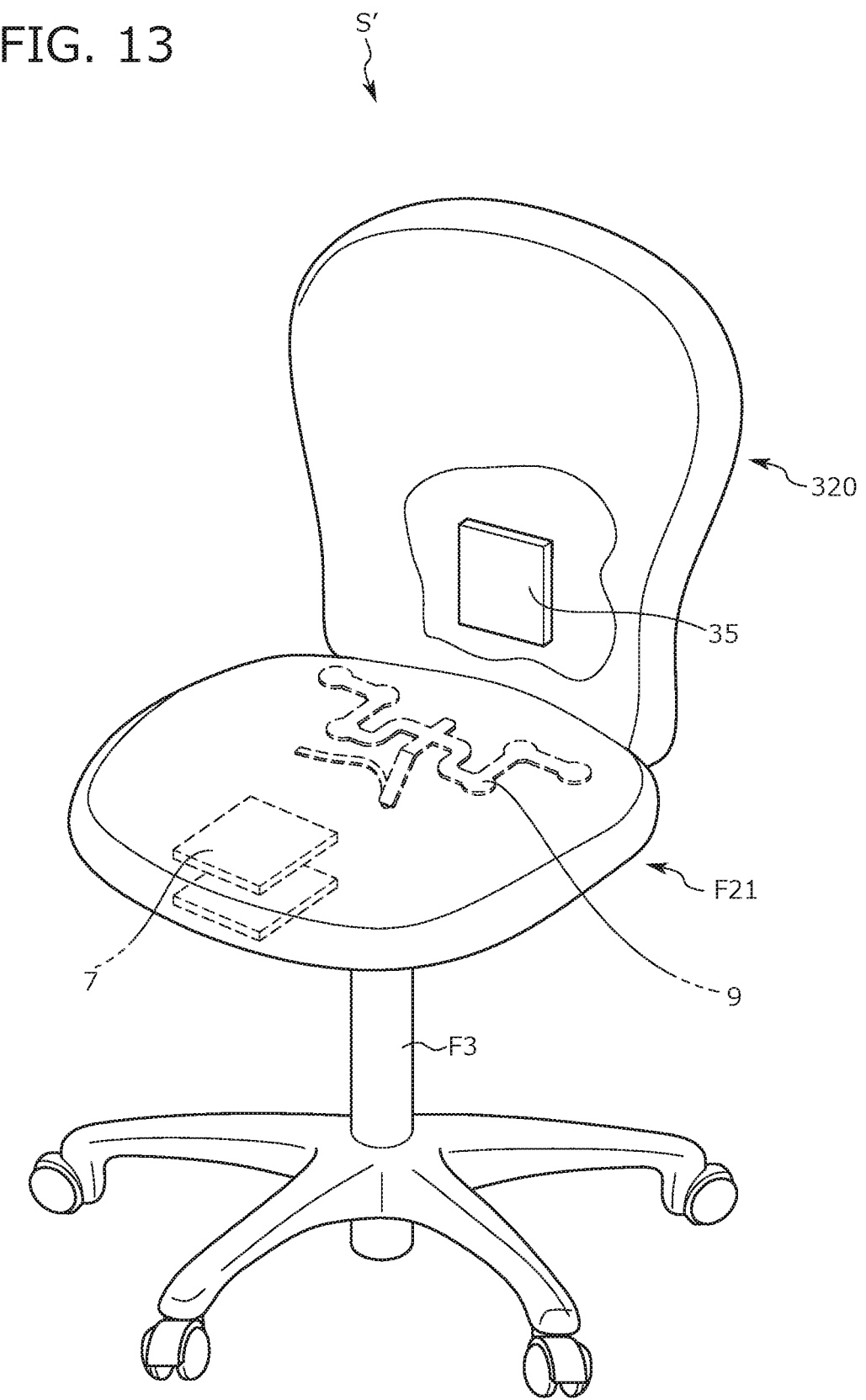
FIG. 13 is a schematic diagram illustrating attachment parts of a drive device and the like according to the third embodiment of the present disclosure.
Figure 14:
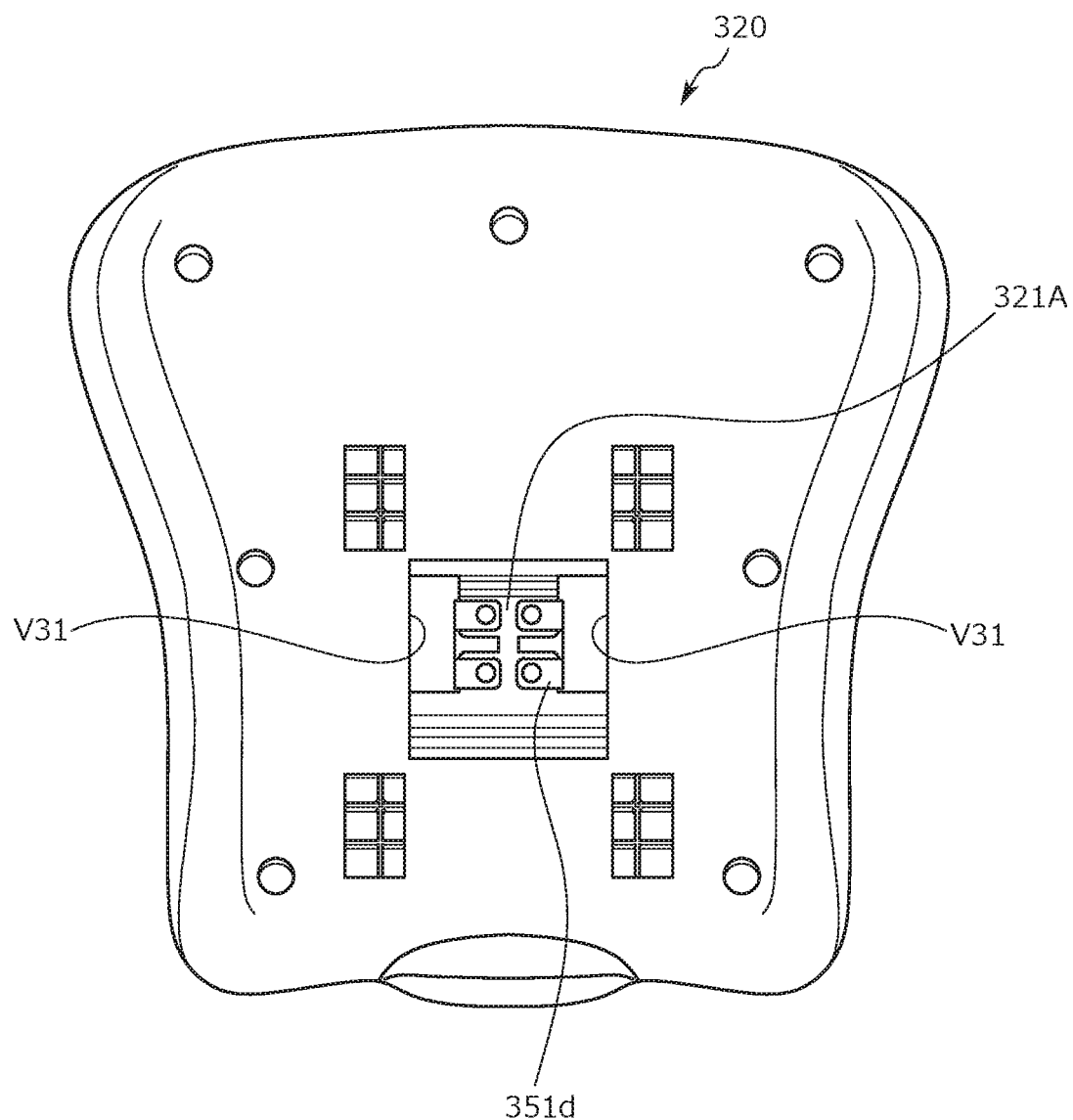
FIG. 14 is an illustrative diagram illustrating attachment parts of the drive device according to the third embodiment of the present disclosure.
Figure 15:
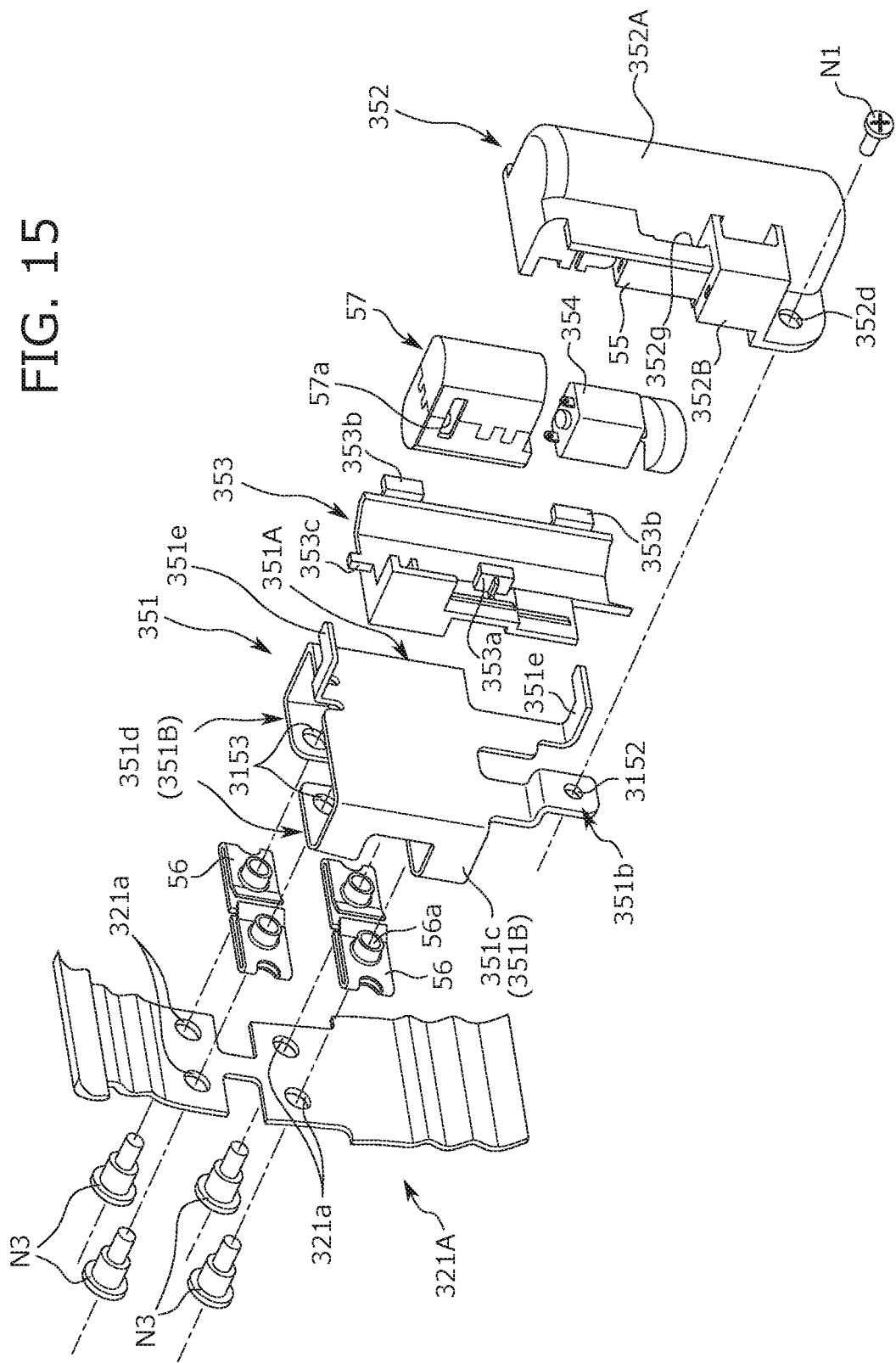
FIG. 15 is an exploded view of attachment of a device drive unit that forms the alertness-maintaining device according to the third embodiment of the present disclosure.
Figure 16:
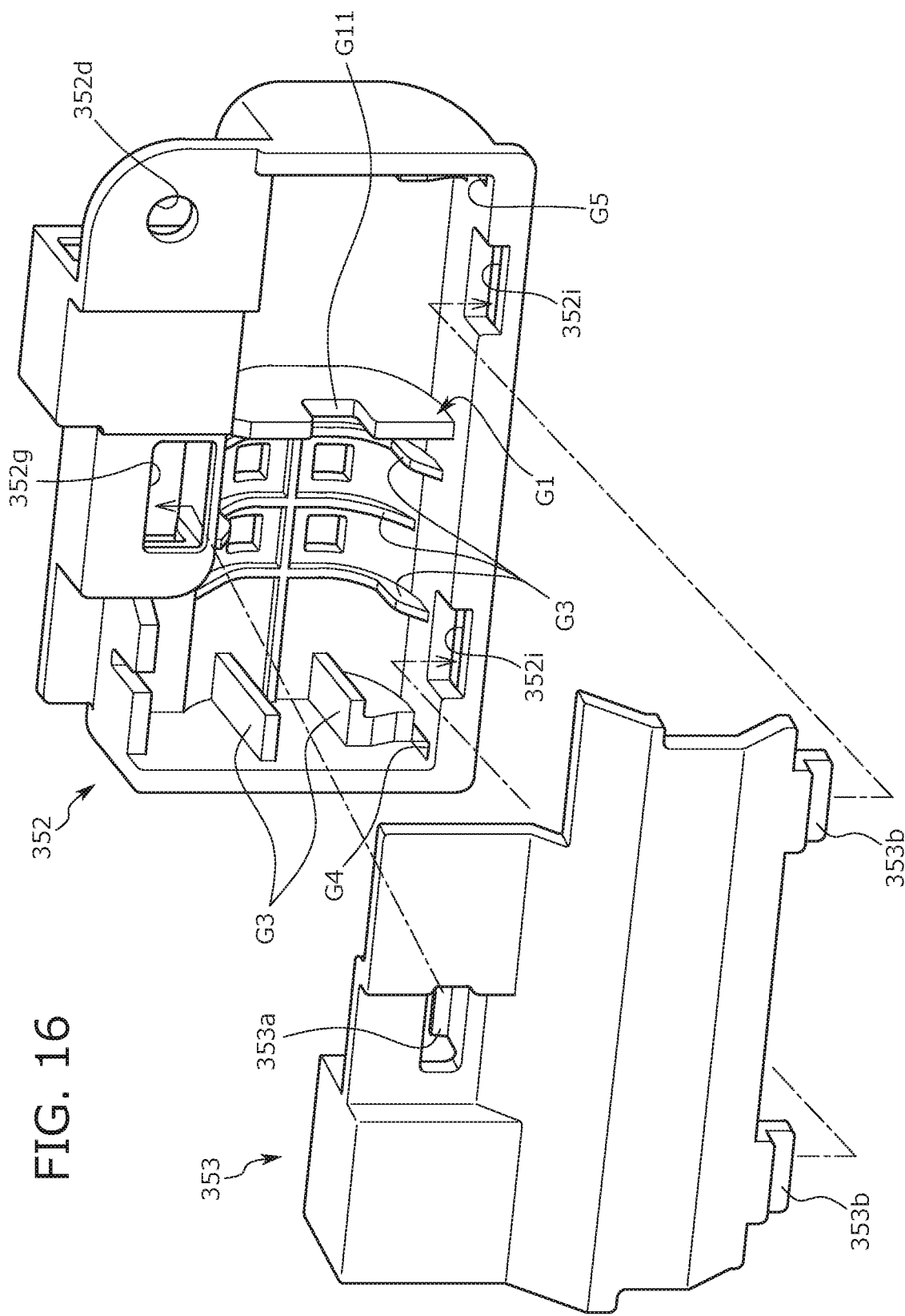
FIG. 16 is an illustrative diagram illustrating a state of assembly of a motor case and a motor cover according to the third embodiment of the present disclosure.
Figure 17:
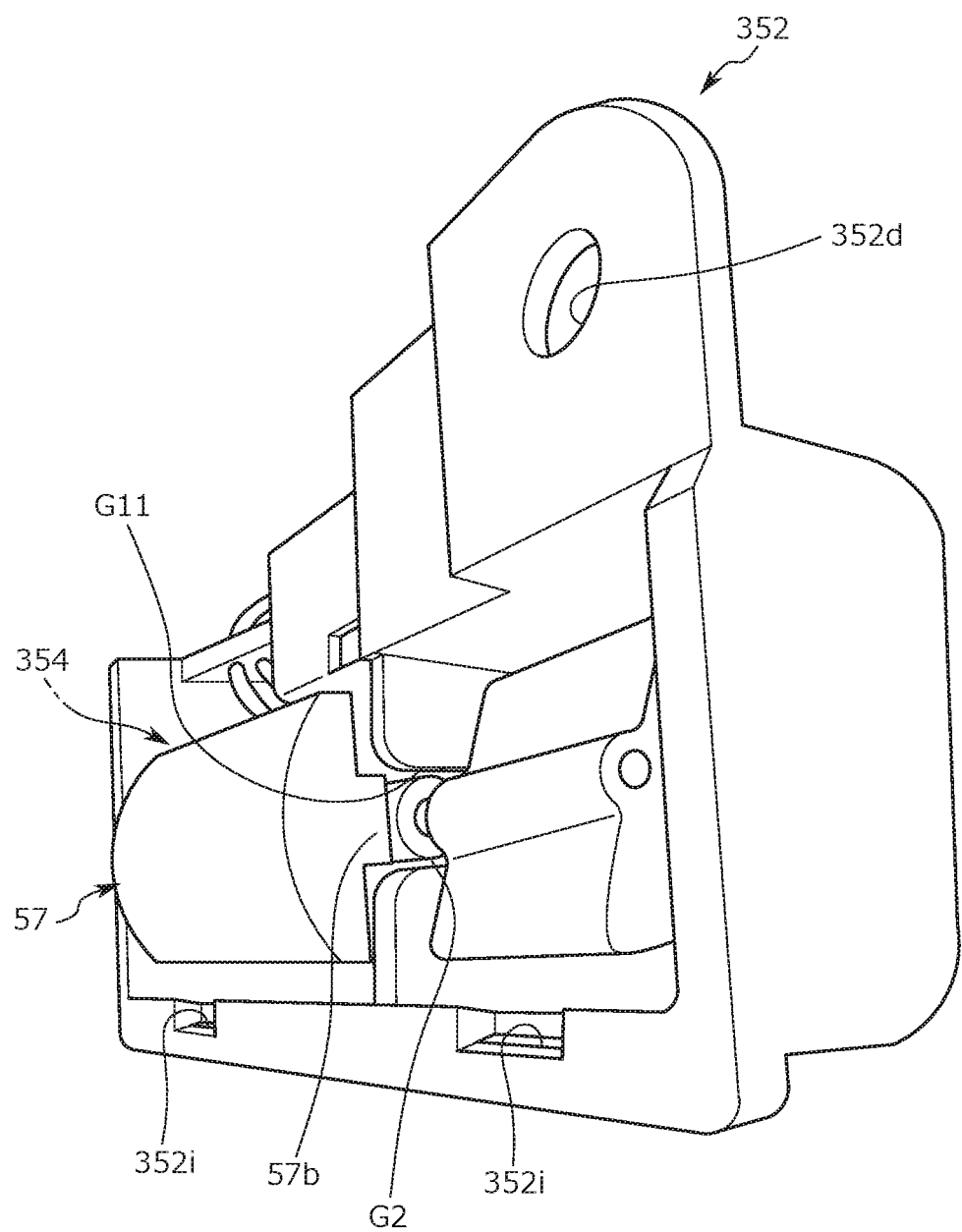
FIG. 17 is an illustrative diagram illustrating a state of placement of a motor according to the third embodiment of the present disclosure.
Figure 18:
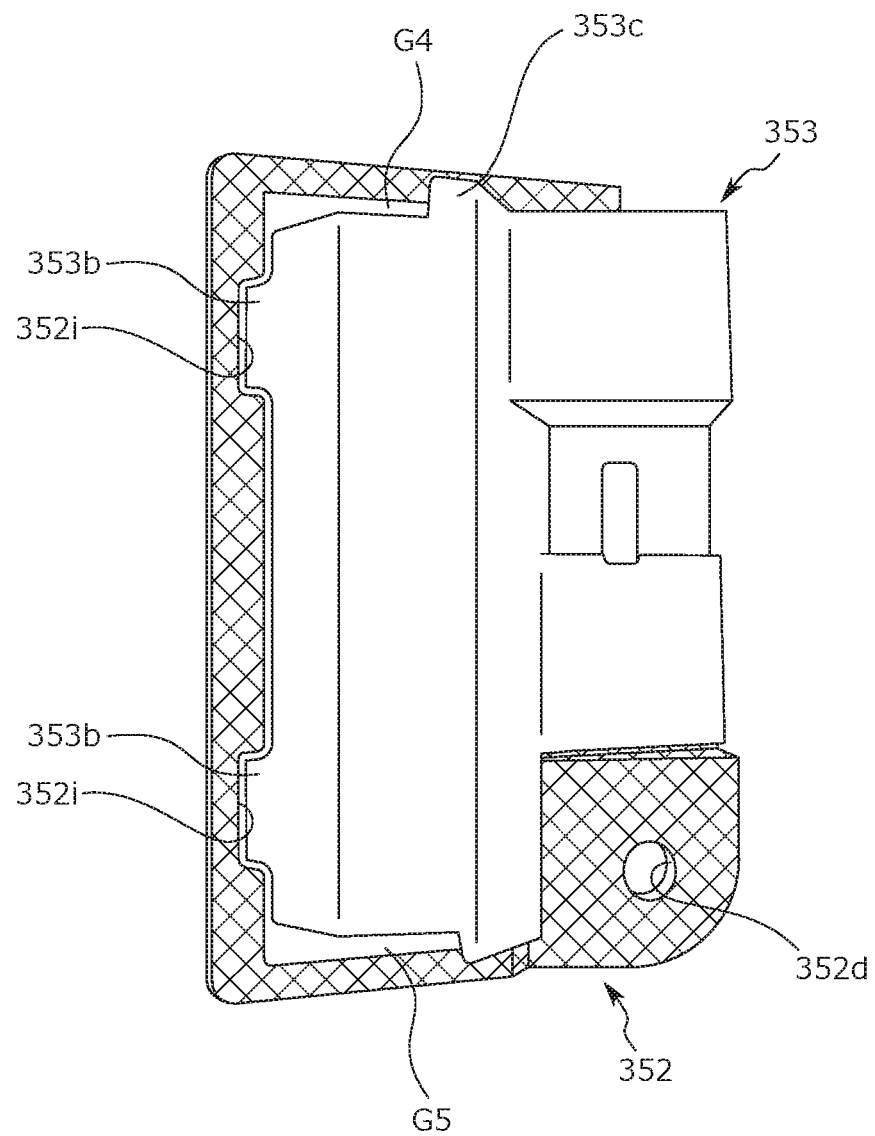
FIG. 18 is an illustrative diagram illustrating an assembly of the motor case and the motor cover according to the third embodiment of the present disclosure.
Figure 19:
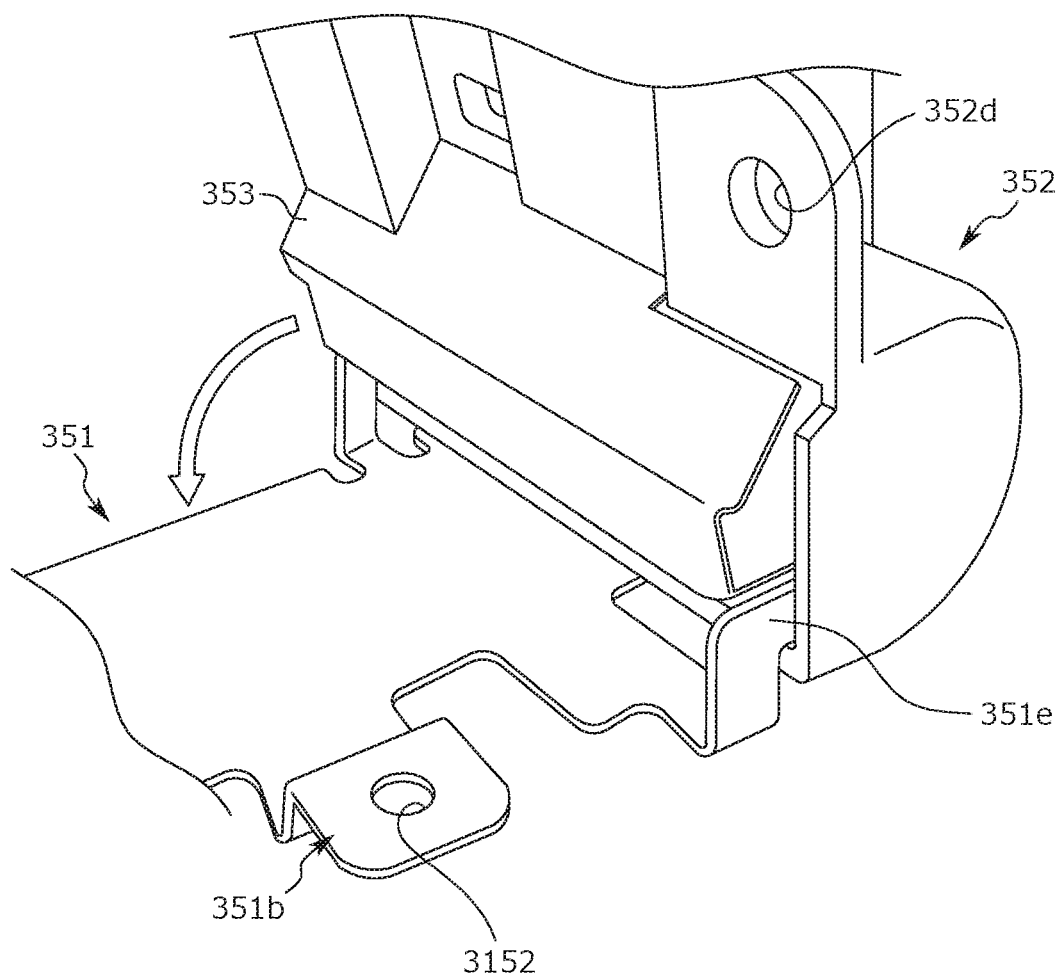
FIG. 19 is an illustrative diagram illustrating a process of attachment of the motor case and the motor cover to a support bracket according to the third embodiment of the present disclosure.
Figure 20:
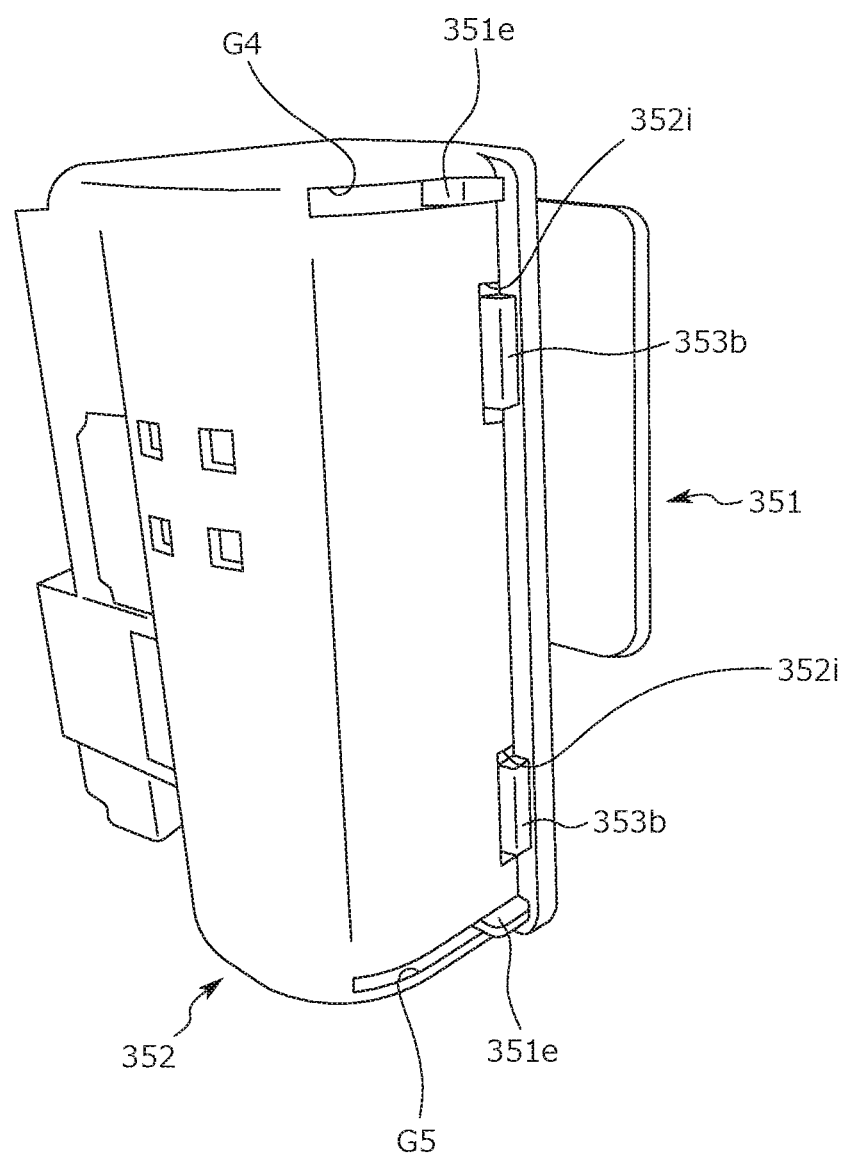
FIG. 20 is an illustrative diagram illustrating a state of attachment of the motor case and the motor cover to the support bracket according to the third embodiment of the present disclosure.
Figure 21:
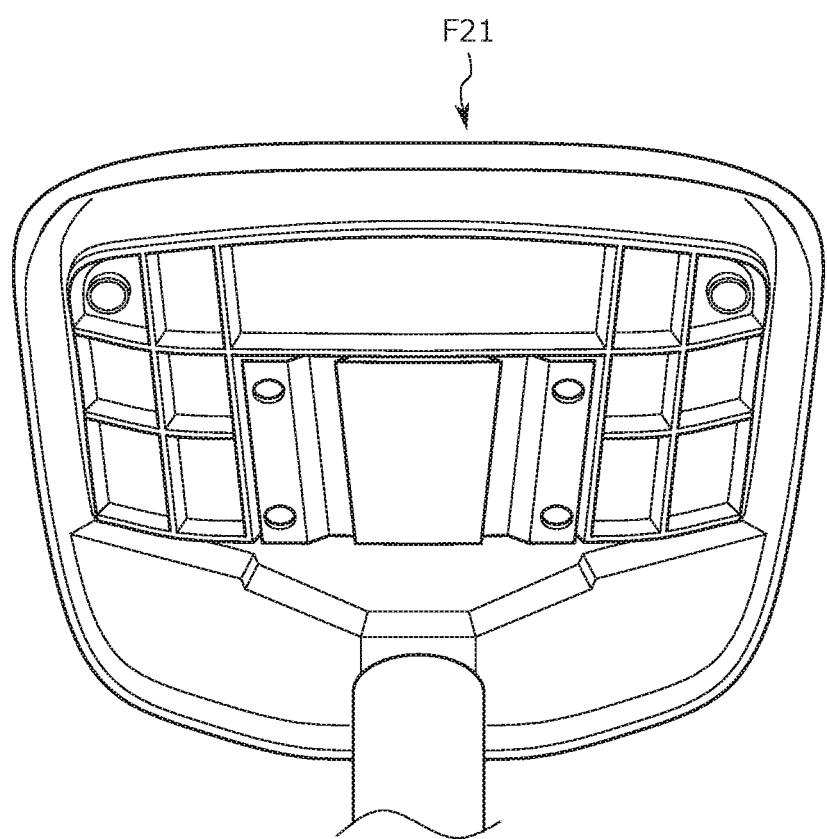
FIG. 21 is an illustrative diagram illustrating an attachment part of an electrical control unit (ECU) according to the third embodiment of the present disclosure.
Figure 22:
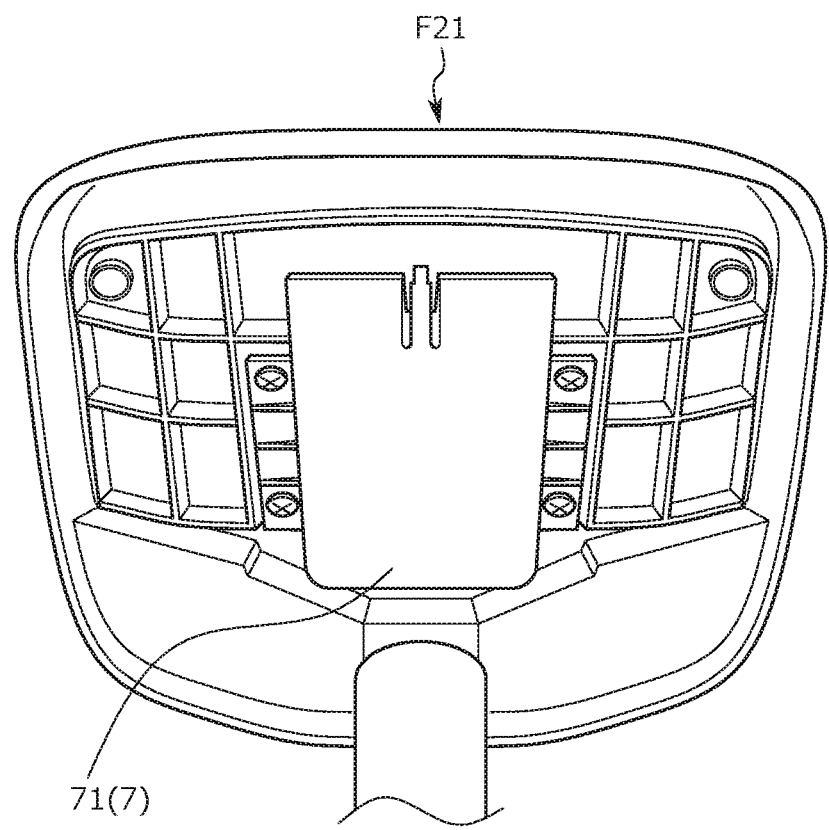
FIG. 22 is an illustrative diagram illustrating a state of attachment of the ECU according to the third embodiment of the present disclosure.
Figure 23:
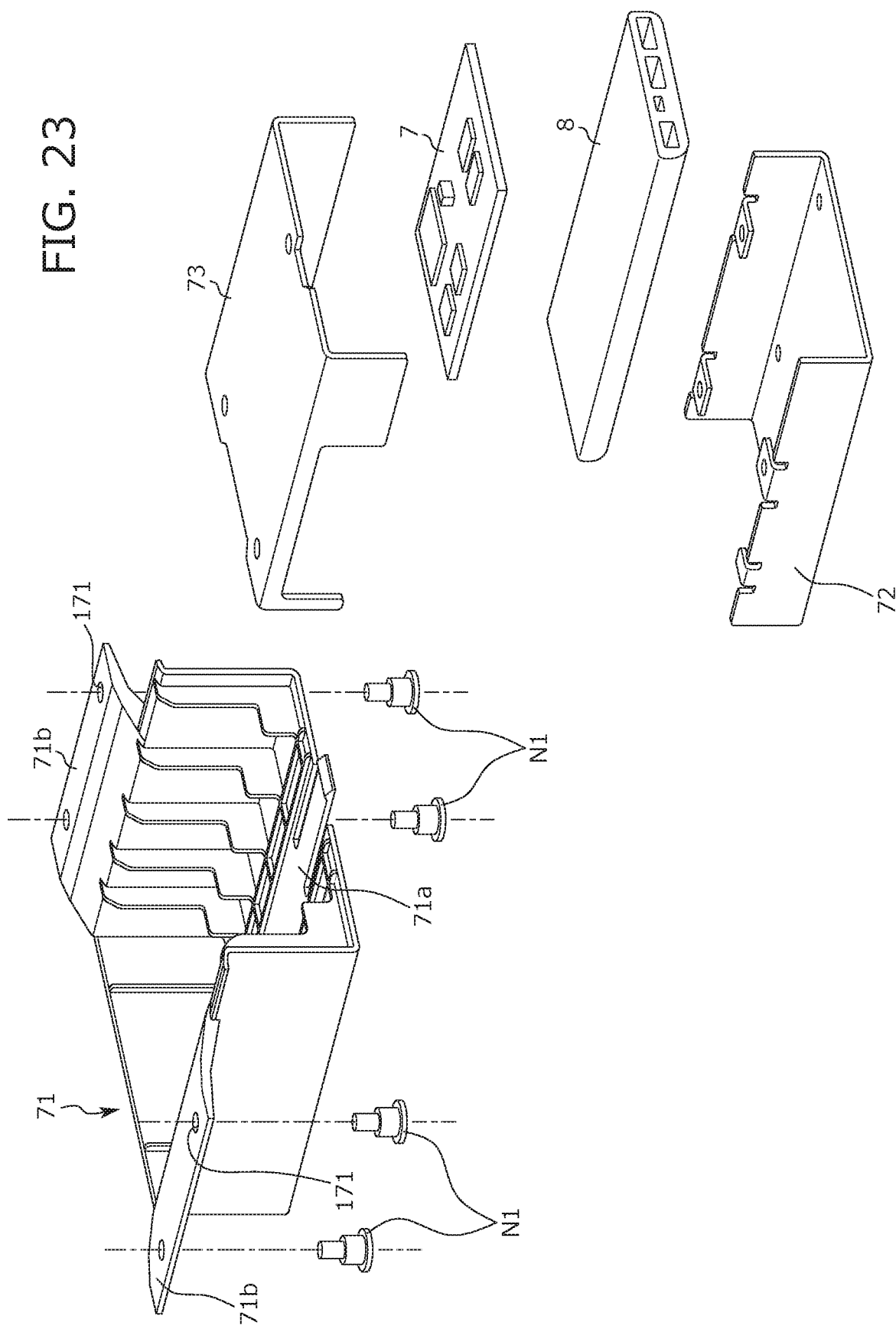
FIG. 23 is an exploded view of attachment of the ECU according to the third embodiment of the present disclosure.

FIGS. 1-9 are to illustrate an embodiment of the present disclosure, and FIG. 1 is an external view of a vehicle seat with an alertness-maintaining device, FIG. 2 is a perspective view of a seat frame, FIG. 3 is a rear view of a seat back frame, FIGS. 4A and 4B are illustrative diagrams of a state of attachment of a support bracket that forms the alertness-maintaining device, FIG. 5 is an exploded view of attachment of a device drive unit that forms the alertness-maintaining device, FIG. 6 is a perspective view of a pressure-receiving member on which the device drive unit is mounted, FIG. 7 is a bottom view of the seat back frame, FIG. 8 is an illustrative diagram illustrating an attachment position of the device drive unit and effects thereof, and FIG. 9 is an enlarged view of an X portion of FIG. 8. Moreover, FIG. 10 is to illustrate a second embodiment of the present disclosure, and is an illustrative perspective view of the alertness-maintaining device. Further, FIGS. 11A and 11B are to illustrate a modified example of the first and second embodiments of the present disclosure, and are illustrative diagrams illustrating an attachment position of the support bracket. Note that FIGS. 12-23 are to illustrate a third embodiment of the present disclosure, and FIG. 12 is an external view of an office chair, FIG. 13 is a schematic diagram illustrating attachment parts of a drive device and the like, FIG. 14 is an illustrative diagram illustrating attachment parts of the drive device, FIG. 15 is an exploded view of attachment of a device drive unit that forms the alertness-maintaining device, FIG. 16 is an illustrative diagram illustrating a state of assembly of a motor case and a motor cover, FIG. 17 is an illustrative diagram illustrating a state of placement of a motor, FIG. 18 is an illustrative diagram illustrating an assembly of the motor case and the motor cover, FIG. 19 is an illustrative diagram illustrating a process of attachment of the motor case and the motor cover to a support bracket, FIG. 20 is an illustrative diagram illustrating a state of attachment of the motor case and the motor cover to the support bracket, FIG. 21 is an illustrative diagram illustrating an attachment part of an ECU, FIG. 22 is an illustrative diagram illustrating a state of attachment of the ECU, and FIG. 23 is an exploded view of attachment of the ECU.

First Embodiment

In the present embodiment, an example in which as a seat with an alertness-maintaining device, the vehicle seat S is selected is illustrated. In other words, in the present embodiment, an example in which the alertness-maintaining device U is mounted on the vehicle seat S is illustrated. As illustrated in FIG. 1, the vehicle seat S according to the present embodiment is made of a seat back S1, a seat cushion S2, and a headrest-securing portion S3 for a headrest (not shown).

With reference to FIGS. 1 and 2, the structure of the vehicle seat S is briefly described. In the vehicle seat S, a seat frame F (see FIG. 2) that serves as a framework is provided. This seat frame F is made of a seat back frame F1 that is a frame of the seat back S1 and a seat cushion frame F2 that is a frame of the seat cushion S2. Then, the seat cushion frame F2 and the seat back frame F1 are connected through a reclining mechanism R. On an outside of the seat back frame F1 and the seat cushion frame F2, a cushion pad K1 and a seat cover K2 are placed, of which the seat back S1 and the seat cushion S2 are made.

Moreover, the unillustrated headrest is a known head rest, is fixed to the headrest-securing portion S3 provided at an upward portion of the seat back frame F1, and supports the head region of an occupant above the seat back S1.

Further, the seat cushion frame F2 is a frame body that is a resin molded into a substantially U-shape, and a substantially U-shape opening part corresponding to a part backward is connected by a connection pipe P in such a manner as to bridge this opening. Moreover, the seat cushion frame F2 is supported by leg portions (not shown), to these leg portions inner rails J2 that form slide mechanisms J being attached, and is assembled in a sliding manner relative to outer rails J1 provided on a vehicle body floor to be positionally adjustable frontward and backward. Moreover, a rear end portion is connected to the seat back frame F1 through the reclining mechanism R.

As illustrated in FIG. 2, in the present embodiment, the seat back frame F1 is a substantially rectangular frame body and is configured to include two side frames 15, an upper frame 16, and a lower frame 17. The two (e.g., a pair of) side frames 15 are placed to be separated in a right and left direction and placed in such a manner as to extend in an upper and lower direction, to form a seat back width. Then, the upper frame 16 that connects upper end portion sides of the pair of side frames 15 extends upward from the side frames 15. Note that the upper frame 16 is placed to extend upward from one side frame 15, is then bent, and is placed to extend to the other side frame 15.

The upper frame 16 made of a member having a closed cross-sectional shape (for example, the cross section is circular, rectangular, or the like) and is bent into a substantially U-like shape as illustrated in FIG. 2. Then, a side surface portion 16a of the upper frame 16 is placed in such a manner as to partially overlap with side plates 15a of the side frames 15 along the upper and lower direction, and is fixed and jointed at this overlapping part to the side frames 15. Note that, in the present embodiment, the upper frame 16 is made of a tubular member having a circular cross section, which, however, may be a tubular member having a rectangular cross section.

As illustrated in FIG. 2, the side frames 15 that form a part of the seat back frame F1 are members forming side surfaces of the seat back frame F1, and include the side plates 15a having a flat-plate shape, front edge portions 15b bent from front end portions (end portions positioned at a vehicle front side) of these side plates 15a inward into a U-shape and folded back, and back edge portions 15c bent from rear end portions inward into an L-shape.

Moreover, in the seat back frame F1 (between the side frames 15 at both sides) and in an inner side region of the seat back frame F1, a pressure-receiving member 20 that supports the cushion pad K1 of the seat back from backward is placed. This pressure-receiving member 20 corresponds to a "load-supporting portion."

The pressure-receiving member 20 according to the present embodiment is a member in which a resin is formed into a plate-shaped substantially rectangular shape, and, as illustrated in FIG. 3, at an upper portion side and a lower portion side on a reverse side of this pressure-receiving member 20, a plurality of claw portions 23a, 23b for retaining an upper wire W1 and a lower wire W2 are provided, respectively.

The pressure-receiving member 20 according to the present embodiment is supported by the upper wire W1 and the lower wire W2. In other words, the upper wire W1 and the lower wire W2 are placed between the side frames 15 at the both sides, are engaged, at the upper portion side and the lower portion side on the reverse side of the pressure-receiving member 20, with the pressure-receiving member 20 by the claw portions 23a, 23b provided at predetermined positions, and support the pressure-receiving member 20. The upper wire W1 and the lower wire W2 are made of steel wires having a spring property and provided with winding portions that are a connection portion.

Further, the upper wire W1 and the lower wire W2 are provided with the winding portions, thereby being substantially deformed by the load greater than or equal to a predetermined load (e.g., a load far exceeding normal usage due to collision or the like) and being configured such that the pressure-receiving member 20 moves backward with a larger movement amount to hold the body of the occupant.

Moreover, connection of the upper wire W1 and the lower wire W2 to the seat back frame F1 may be performed according to known methods, but, as an example, a method of guiding a sinking of the occupant using movement members is hereinafter briefly described. In this method, both end portions of the upper wire W1 that are retained by the pressure-receiving member 20 are hooked upon shaft-supporting portions (not shown) provided in the side frames 15 at the both sides. Both end portions of the lower wire W2 are hooked upon, for example, movement members (not shown). These movement members, which do not directly relate to the present disclosure and the detailed description of which is thus omitted, are employed as impact reduction members, and are moved backward of a vehicle by an impact load transmitted through the lower wire W2 while moving the pressure-receiving member 20 backward to move the occupant backward when an impact load greater than or equal to the predetermined load is applied to the pressure-receiving member 20 due to rear end collision or the like. The movement members are pivotally journaled by, for example, the side plates 15a. Then, the movement members are provided with the lower wire W2 while connected to extension coil springs for biasing this lower wire W2. In other words, the movement members are connected to the extension coil springs and configured to bias the pressure-receiving member 20 through the lower wire W2 to a front side of the seat back frame F1.

Under normal usage, the movement members abut against the side frames 15, which restrains a force applied upward by the extension coil springs and restricts a movement (pivot) range such that the movement members do not excessively move (pivot) forward. Then, upon rear end collision, when the occupant is to move backward by inertia, the load thereof generates a tensile force in a direction to move (pivot) the movement members (not shown) backward through the pressure-receiving member 20 and the lower wire W2 retained by the pressure-receiving member 20. The tensile force on this occasion extends the extension coil springs (not shown) holding the movement members 30 at initial positions and serves as the load sufficient to move (pivot) the movement members (not shown) backward. Then, the movement members are made to move (pivot) backward, whereby the lower wire W2 hooked upon the movement members are moved backward, while the pressure-receiving member 20 caught by the lower wire W2 and the cushion pad K1 supported by the pressure-receiving member 20 are moved backward, which allows the occupant to sink within the seatback S1. Note that a configuration made in the pressure-receiving member 20 for mounting the alertness-maintaining device U is described in detail below.

Alertness-Maintaining Device

The alertness-maintaining device U is now described. The alertness-maintaining device U according to the present embodiment generally includes the device drive unit 5, an electrical connection wire 6, and an electronic control unit (ECU) 7. In general, a configuration is employed in which the device drive unit 5 attached to a rear surface side of the pressure-receiving member 20 and the ECU 7 attached to a bottom surface front side of the seat cushion frame F2 are connected to each other by the electrical connection wire 6. Hereinafter, the configuration is described in order.

The device drive unit 5 according to the present embodiment is attached to the rear surface side of the pressure-receiving member 20. Specifically, as illustrated in FIGS. 4A and 4B, a lower part of the pressure-receiving member 20 is provided with a drive unit attachment portion 21A, and the drive unit attachment portion 21A is provided with a plurality of load-supporting portion side attachment holes 21a. In an example according to the present embodiment, two of the drive unit attachment portions 21A are provided at a lower side of the pressure-receiving member 20 to be separated in the right and left (e.g., the seat width) direction.

This drive unit attachment portion 21A is a protrusion portion having a substantially rectangular shape extending in the upper and lower direction and projecting on a rear surface side, and a projection top surface thereof (hereinafter, the projection top surface is referred to as "pressure-receiving member side attachment top surface H") is provided with two of the load-supporting portion side attachment holes 21a aligned in the upper and lower direction. Note that a lower end side surface of this drive unit attachment portion 21A provided as the protrusion portion is open, so that, at a front side of the drive unit attachment portion 21A (which is the reverse face of the protrusion portion and forms a recessed portion), a load-supporting portion-clamping piece 51B that forms a support bracket 51 as described below can be stored.

As illustrated in FIGS. 4A and 4B, the support bracket 51 that forms the device drive unit 5 is attached to the drive unit attachment portion 21A. Note that, in the present embodiment, the device drive unit 5 is placed in the vicinity of the lumbar region of the back of the occupant.

The device drive unit 5 according to the present embodiment is configured to generally include the support bracket 51 as a support member, a motor case 52, a motor cover 53, a motor 54, and a coupler 55. The support bracket 51 according to the present embodiment is a metal and substantially U-shaped member. The support bracket 51 is configured to include a motor attachment surface portion 51A that is a substantially U-shaped flat plate and two of the load-supporting portion-clamping pieces 51B.

The motor attachment surface portion 51A forms a substantially U-shape by motor side clamping portions 51a, 51a that are rectangular flat plates extending in the upper and lower direction and placed to be separated in such a manner as to be parallel in a width direction and a fastening portion 51b that bridges upper end parts of these motor side clamping portions 51a, 51a. The fastening portion 51b is configured in such a manner as to slightly project backward relative to the motor side clamping portions 51a, 51a. This is a configuration for latching together the motor case 52 as described below. Moreover, the motor side clamping portions 51a, 51a are provided with a plurality of support bracket side attachment holes 151. In the present example, one piece on one side and two pieces aligned in the upper and lower direction on the other side are formed.

Note that the distance between the motor side clamping portions 51a, 51a is configured in such a manner as to be matched to the distance between the drive unit attachment portions 21A, 21A provided on the pressure-receiving member 20, and is configured such that, when these parts are overlapped each other, the load-supporting portion side attachment holes 21a and the support bracket side attachment holes 151 communicate with each other. Further, to a surface backward (in other words, a side on which the motor 54 is placed) of the plurality of (three in the present example) support bracket side attachment holes 151, well nuts N2 are each welded. Moreover, the fastening portion 51b is provided with a motor case attachment hole 152.

Further, the load-supporting portion-clamping pieces 51B according to the present embodiment are parts formed into an L-shape by extension portions 51c extending horizontally frontward from lower end portions of the motor side clamping portions 51a and opposing side clamping portions 51d standing from front end portions of these extension portions 51c in such a manner as to be opposed to the motor side clamping portions 51a in parallel. The motor side clamping portions 51a and the opposing side clamping portions 51d are opposed to each other to have a gap substantially identical to the thickness of the pressure-receiving member side attachment top surfaces H of the drive unit attachment portions 21A, and thus, the support bracket 51 is temporarily fixed to the pressure-receiving member 20 while grasping the pressure-receiving member side attachment top surfaces H by these motor side clamping portions 51a and opposing side clamping portions 51d.

Moreover, the opposing side clamping portions 51d, 51d are provided with a plurality of clamping piece side attachment holes 153. In the present example, one piece on one side and two pieces aligned in the upper and lower direction on the other side are formed. In other words, these plurality of clamping piece side attachment holes 153 are formed at positions to be opposed to and to be matched to the plurality of support bracket side attachment holes 151 formed in the motor side clamping portions 51a, 51a (in other words, at positions at which horizontal communication is made).

Moreover, from lower sides of the motor side clamping portions 51a, 51a, reverse L-shaped motor case-latching portions 51e, 51e extending backward and then hanging down downward are provided, respectively. In these motor case-latching portions 51e, 51e, lower end portions thereof are hooked upon support bracket side latching portion through holes 52h, 52h formed at a lower part of a motor-housing portion 52A of the motor case 52 as described below, and this configuration allows the motor case 52 to be temporarily fixed to the support bracket 51.

The motor case 52 according to the present embodiment is a case for internally housing the motor 54 and disposing the coupler 55, and is configured to include the motor-housing portion 52A and a coupler placement portion 52B. The motor-housing portion 52A has a hollow case shape, and side surface portions thereof are gently curved in such a manner as to be matched to a yoke outer shape of the motor 54. Then, an upward portion of the motor-housing portion 52A is formed to be horizontal (this surface formed to be horizontal is referred to as "motor-housing portion top surface 52a").

Moreover, from the motor-housing portion top surface 52a, the coupler placement portion 52B stands vertically. An upward portion of the coupler placement portion 52B is provided with a step in the upper and lower direction, from an upper end portion of which an upper end edge 52b extending in a pressure-receiving member 20 direction is provided. Moreover, on a side of the coupler placement portion 52B in which the distance from the motor-housing portion top surface 52a is large, a coupler attachment hole 52c is formed, and on a side in which the distance from the motor-housing portion top surface 52a is small, a support bracket attachment hole 52d and a coupler connection wire lead-in hole 52e are formed.

Note that, at the side in which the distance from the motor-housing portion top surface 52a is small, the upper end edge 52b extending from the upper end portion in the pressure-receiving member 20 direction is referred to as "support bracket-latching edge 52f."

Further, at a boundary part of the motor-housing portion top surface 52a and the coupler placement portion 52B, slit-shaped motor cover latching holes 52g, 52g that are horizontally cut in are formed to be horizontally aligned. Moreover, at both end portions at a lower side of the motor-housing portion 52A, support bracket side latching portion through holes 52h, 52h that are cut out in such a manner as to extend in the upper and lower direction are provided, respectively, to be horizontally aligned.

The motor cover 53 according to the present embodiment is a cover member for internally storing the motor 54 by being integrated with the motor-housing portion 52A of the motor case 52, and is gently curved in such a manner as to be matched to the yoke outer shape of the motor 54. At an upper end of the motor cover 53, motor cover side latching claws 53a, 53a are provided in a projecting manner to be horizontally aligned, and, at a lower end of the motor cover 53, motor cover side latching hooks 53b, 53b are provided in a projecting manner to be horizontally aligned.

The motor cover side latching claws 53a, 53a are inserted into and engaged with the motor cover latching holes 52g, 52g of the motor case 52, and in this state, the motor cover side latching hooks 53b, 53b are press-fitted into a lower end edge portion of the motor-housing portion 52A of the motor case 52. Thereby, the motor case 52 and the motor cover are fitted together, and in the interior thereof, a space in which the motor 54 is installed is formed.

The motor 54 is a so-called "vibration motor" made of a known unbalanced mass motor. To an output shaft head end part of this motor 54, a weight is attached in an unbalanced manner (which is an unbalanced mass), and the configuration is made such that, when the motor 54 is driven and an output shaft rotates, vibrations are generated due to the unbalanced center of gravity of the weight. As described above, the motor 54 is installed in the space enclosed by the motor-housing portion 52A of the motor case 52 and the motor cover 53.

Then, a rotating shaft of the unbalanced mass is placed to be aligned in a width direction of the pressure-receiving member 20. In other words, the motor 54 is thus placed, thereby applying reciprocal vibrations from the pressure-receiving member 20 through the seat back S1 vertically on the back of the occupant while driven, so that a vibratory stimulus is effectively imparted to the occupant.

The coupler 55 according to the present embodiment is a known coupler including a coupler attachment hook (not shown). The coupler 55 is attached to the motor case 52 by engaging the coupler attachment hook (not shown) with the coupler attachment hole 52c formed in the motor case 52. Moreover, a motor connection wire 55a to the motor 54 is a lead wire, and is led from the coupler connection wire lead-in hole 52e formed in the motor case 52 to a motor 54 side and connected to the motor 54.

A method of attaching the device drive unit 5 in which the support bracket 51, the motor case 52, the motor cover 53, the motor 54, and the coupler 55 that are configured as described above are assembled to the pressure-receiving member 20 is described with reference to FIGS. 4-6. FIG. 4 is to illustrate an attachment position of the support bracket 51, and an attachment process is described with reference to an exploded view of FIG. 5. Moreover, FIG. 6 is to illustrate an assembled state. The coupler 55 is engaged with the coupler attachment hole 52*c* formed in the motor case 52, thereby being attached to the motor case 52, then the motor connection wire 55*a* is led from the coupler connection wire lead-in hole 52*e* into a motor 54 placement side to be connected to the motor 54, and the motor 54 is stored in the motor-housing portion 52A.

Subsequently, the motor cover side latching claws 53*a*, 53*a* formed in the motor cover 53 are inserted into and engaged with the motor cover latching holes 52*g*, 52*g* of the motor case 52, while the motor cover side latching hooks 53*b*, 53*b* are press-fitted into the lower end edge portion of the motor-housing portion 52A of the motor case 52, whereby the motor 54 is covered.

In this state, the motor case-latching portions 51*e* provided to the support bracket 51 are hooked to a support bracket side latching portion through hole 52*h* formed on a lower end portion of the motor-housing portion 52A, while the support bracket attachment hole 52*d* formed in the motor case 52 and the motor case attachment hole 152 formed in the support bracket 51 are allowed to communicate with each other, and, into this communication hole, a tapping screw N1 is inserted and tapped, whereby the motor case 52 and the motor cover 53 to which the motor 54 and the coupler 55 are provided is attached to the support bracket 51.

Thus, a motor unit M in which the motor case 52 and the motor cover 53 are provided with the motor 54 and the coupler 55 is mounted on the support bracket 51. Then, the support bracket 51 on which the motor unit M is mounted is temporarily fixed to the pressure-receiving member 20 while grasping the pressure-receiving member side attachment top surfaces H by the motor side clamping portions 51*a* and the opposing side clamping portions 51*d*.

Then, the load-supporting portion-clamping piece 51B can be stored at a front of the drive unit attachment portion 21A that is formed as the protrusion portion (which is the reverse face and forms the recessed portion), so that a front of the pressure-receiving member 20 (in other words, a part in contact with the back of the occupant) can be configured to be flat. Consequently, partial deformation of the cushion pad K1 can be reduced and seating comfort can be improved.

Then, according to the configuration as described above, when the support bracket 51 on which the motor unit M is mounted is temporarily fixed to the pressure-receiving member 20 while grasping the pressure-receiving member side attachment top surfaces H by the motor side clamping portions 51*a* and the opposing side clamping portions 51*d*, the plurality of support bracket side attachment holes 151, the plurality of load-supporting portion side attachment holes 21*a*, and the plurality of clamping piece side attachment holes 153 communicate with each other, so that, into these communication holes, shoulder bolts N3 are fastened. In this case, the shoulder bolts N3 are inserted from frontward of the pressure-receiving member 20 and fastened in the well nuts N2 welded to the surface backward (in other words, a side on which the motor 54 is placed) of the support bracket side attachment holes 151. This configuration allows the support bracket 51 on which the motor unit M is mounted to be fixed to the pressure-receiving member 20. Note that the above description is to illustrate an example of the assembly structure, but not to define the assembly procedure, and, as a matter of course, alternatively, it is possible that the support bracket 51 is attached to the pressure-receiving member 20 and then the motor unit M is attached.

Note that, in the present example, while the metal support bracket 51 grasps the resin pressure-receiving member side attachment top surfaces H by the motor side clamping portions Ma and the opposing side clamping portions Md, the shoulder bolts N3 are fastened. The shoulder bolts N3 are thus used, which enables fastening without excessive fastening of a resin part (pressure-receiving member side attachment top surfaces H). In other words, fastening can be securely performed while deformation of the resin part (the pressure-receiving member side attachment top surfaces H) is reduced.

With reference to FIG. 7, configurations of the electrical connection wire 6 and the ECU 7 is briefly described. The ECU 7 (Electrical Control Unit) is a central processor that synthetically executes an electric control, and, in the present example, is configured to perform a drive control of the motor 54 based on a potential difference signal converted into a digital signal. The ECU 7 according to the present embodiment is a common ECU in terms of hardware that is configured to include a CPU (Central Processing Unit), a ROM (Read Only Memory), a RAM (Random Access Memory), and the like, for a computation control.

Note that a signal input to the ECU 7 is a potential difference signal converted into a digital signal by a signal processing circuit, and what is output is an electric power for driving the motor 54. The RAM is configured to temporarily store parameters including a signal under the computation control and a signal that is input and output, and functions as a storage unit for storing a potential difference signal converted into a digital signal and other signals.

The ROM is configured to store programs executed by the CPU and parameters at a predetermined value, and, for example, a reference value setting unit for setting a predetermined reference value, a determination unit for determining an alertness state based on a reference value, a drive unit for driving the motor 54, and the like, are recorded as programs. This drive unit is configured to drive the motor 54 by supplying electric power in accordance with an instruction by the CPU. This instruction signal by the CPU is created by computing a signal from a sensor 9*a* shown in FIG. 7. In other words, the configuration is made such that, based on a signal transmitted from a known sensor, such as a heartbeat sensor, an alertness state of the occupant is judged, and when a judgment of a non-alertness state is made, a signal for driving the motor 54 is transmitted from the CPU. Note that this configuration may be any known configuration.

As illustrated in FIG. 7, the electrical connection wire 6 connects the device drive unit 5 attached to the rear surface side of the pressure-receiving member 20 to the ECU 7 attached to the bottom surface front side of the seat cushion frame F2. One end of the electrical connection wire 6 is connected to the coupler 55 included in the device drive unit 5 and the other end is connected to the ECU 7.

Next, with reference to FIGS. 8 and 9, a reason of disposing the device drive unit 5 at this position is described. As illustrated in FIG. 9, on an ordinary occasion, a position of the pressure-receiving member 20 is a position L1, whereas, on a seating occasion, the position of the pressure-receiving member 20 is moved backward to the position L2. The device drive unit 5 is placed at a position at which no influence is exerted on a back end position of the seat back. In other words, even if, on the seating occasion, the pressure-receiving member 20 is moved backward, an influence of the device drive unit 5 on a seat back external appearance (by projecting backward) can be avoided.

Second Embodiment

Next, a second embodiment of the present disclosure is described. Also in the present embodiment, an example in which as a seat with an alertness-maintaining device, the vehicle seat S is selected is illustrated. In other words, also in the present embodiment, similarly to the first embodiment as described above, an example in which the alertness-maintaining device U is mounted on the vehicle seat S is illustrated. Since the present example is an improvement example of the embodiment as described above, the description on similar components is omitted, and the description generally on different components is made. In the present example, a method of using the coupler 55 in the first embodiment as described above is different. A motor case 252 according to the present example is configured to include a motor-housing portion 152A, a coupler placement portion 152B, a connection wire-fixing wall 152C, and a side surface cover 152D. The motor-housing portion 152A has a hollow case shape, and side surface portions thereof are gently curved in such a manner as to be matched to a yoke outer shape of the motor 54. Then, an upward portion of the motor-housing portion 152A is partially formed to be horizontal (this surface formed to be horizontal is referred to as "motor-housing portion top surface 152a").

Moreover, from the motor-housing portion top surface 152a, the connection wire-fixing wall 152C stands vertically. An upper end portion of the connection wire-fixing wall 152C is provided with an upper end edge 152b extending therefrom in the pressure-receiving member 20 direction. The coupler placement portion 152B standing up to have a case shape in such a manner that a motor-housing space continues from a part of the motor-housing portion 152A (a part above which formation is not horizontally made) is provided. Further, in the coupler placement portion 152B, an opening for coupler placement is formed on a side on which the horizontal surface of the motor-housing portion 152A is formed, and the coupler 55 is inserted into this part. Moreover, the side surface cover 152D is a rectangular flat plate-shaped member and covers an outer side surface portion of the motor-housing portion 152A and the coupler placement portion 152B. In an inner surface of this side surface cover 152D, terminals T1, T2, T3 are placed. Consequently, if the terminal T3 is connected to a motor 54 side and this side surface cover 152D is placed, merely inserting the coupler 55 into the coupler placement portion 152B allows the coupler 55 and the motor 54 to be electrically communicated with each other.

Note that, in the connection wire-fixing wall 152C, two holes are formed to be horizontally aligned, into one of which a coupler attachment hook (not shown) of the coupler 55 is inserted to be fixed. Moreover, to the other, a connection wire-fixing member Q formed into a ring shape is attached, and the configuration is made in such a manner as to guide an electrical connection wire attached to the coupler 55.

Modified Example

Next, with reference to FIGS. 11A and 11B, a modified example of the first and second embodiments is described.

Also in this modified example, an example in which the alertness-maintaining device U is mounted on the vehicle seat S is illustrated. In this modified example, an attachment position of the support bracket 51 is modified. In other words, the attachment position of the support bracket 51 is displaced upward. Accordingly, below the drive unit attachment portions 21A, 21A, two through holes V1 for allowing the opposing side clamping portions 51d, 51d to pass to a front side of the pressure-receiving member 20 are formed. Such a configuration allows a state in which the pressure-receiving member side attachment top surfaces H are grasped by the motor side clamping portions 51a and the opposing side clamping portions 51d to be formed even at a center portion of the pressure-receiving member 20.

Third Embodiment

The first embodiment and the second embodiment can be similarly applied to an office seat S'. In this embodiment, a device drive unit 35 is mounted on a back pan 320. In other words, the back pan 320 corresponds to a "back part" and the "load-supporting portion," and corresponds to the pressure-receiving member 20 according to the embodiments as described above. Note that, in the present example, as applied to the office seat S', the back pan 320 fails to have such a configuration as to be connected to a wire or the like, as in the embodiments as described above, but has a configuration for supporting the load applied to the back region of the occupant and as a frame of a so-called "backrest" part. Moreover, in the present example, in place of attachment to the bottom surface front side of the seat cushion frame F2, attachment of the ECU 7 to a cushion pan F21 as a seat part is made. Then, both are connected to each other by the electrical connection wire 6 similarly to the embodiments as described above. The description on the others, which are similar according to the embodiments as described above, is thus omitted or briefly made.

With reference to FIGS. 12-23, a specific example of application to the office seat S' is described. As illustrated in FIG. 12, the office seat S' is configured to include the cushion pan F21 that supports the gluteal region of the occupant, the back pan 320 that is connected to this cushion pan F21 and supports the back region of the occupant, and a leg portion F3 that vertically extends from a bottom surface of the cushion pan F21 and includes a lower end portion branched into four pieces. Note that a cushion pan F21 backward center portion side and a back pan 320 lower end center portion side are bridged by an L-shaped connection member (not shown). Then, the leg portion F3 supports the cushion pan F21, the back pan 320, and the weight of the occupant, and allows the cushion pan F21 and the back pan 320 to stand from the ground surface. Note that, in the present example, as a sensor for transmitting a signal for driving a motor 354, a respiration sensor 9 placed at a back side of the cushion pan F21 (at a side of a connection portion to the back pan 320) is used. Specifically, the configuration is made such that, based on a signal transmitted from the respiration sensor 9, an alertness state of the occupant is judged, and when a judgment of an unalert state is made, a signal for driving the motor 354 is transmitted from the CPU mounted on the ECU 7. Note that this configuration may be any known configuration.

As illustrated in FIG. 13, the ECU 7 that forms the alertness-maintaining device U is attached on a bottom surface side of the cushion pan F21, and the device drive unit 35 is attached in the vicinity of a center portion of a surface of the back pan 320 that faces an occupant side. In FIG. 14, an attachment portion of the device drive unit 35 is illustrated. As illustrated in FIG. 14, in the vicinity of the center portion of the back pan 320, two rectangular through holes V31, V31 are formed to be aligned in a width direction, and a drive unit attachment portion 321A is provided between these through holes V31, V31. This drive unit attachment portion 321A is provided with four load-supporting portion side attachment holes 321a.

With reference to FIG. 15, an attachment state is briefly described. Similarly to the embodiments as described above, the device drive unit 35 according to the present embodiment is configured to generally include a support bracket 351 as a support member, a motor case 352, a motor cover 353, a motor 354, and the coupler 55. The support bracket 351 according to the present embodiment is a metal member. A shape of the support bracket 351 is slightly different in embodying the application relative to the embodiments as described above, and is configured to include a motor attachment surface portion 351A formed into a rectangular flat plate shape and four load-supporting portion-clamping pieces 351B.

The motor attachment surface portion 351A is configured in such a manner as to latch together the motor case 352 as described below by motor case-latching portions 351e, 351e extending in the upper and lower direction, and is configured to fix the motor case 352 as described below by a motor case attachment hole 3152 formed in a fastening portion 351b extending downward.

Further, the load-supporting portion-clamping pieces 351B according to the present embodiment are parts formed into an L-shape by extension portions 351c extending horizontally frontward from upper and lower end portions of each of sides of the motor attachment surface portion 351A that are separated in a width direction and opposing side clamping portions 351d bending inward from front end portions of these extension portions 351c in such a manner as to be opposed to the motor attachment surface portion 351A in parallel. The opposing side clamping portions 351d and the motor attachment surface portion 351A are opposed to each other to have a gap substantially identical to the thickness in which the thickness of the drive unit attachment portion 321A is added with the thickness of spring nuts 56, and thus, the support bracket 351 is fixed to the back pan 320 while grasping the drive unit attachment portion 321A and the spring nuts 56 by these motor attachment surface portion 351A and opposing side clamping portions 351d.

Moreover, the four opposing side clamping portions 351d are provided with a plurality of clamping piece side attachment holes 3153, respectively. These clamping piece side attachment holes 3153 are formed at positions to be matched to the load-supporting portion side attachment holes 321a (in other words, at positions at which horizontal communication is made). The motor case 352 according to the present embodiment is a case for internally housing the motor 354 and disposing the coupler 55, and is configured to include a motor-housing portion 352A and a coupler placement portion 352B. The motor-housing portion 352A has a hollow case shape, side surface portions thereof being gently curved in such a manner as to be matched to a yoke outer shape of the motor 354, and internally stores the motor 354. Moreover, from a top surface of the motor-housing portion 352A, the coupler placement portion 352B stands, and the coupler 55 is stored. Further, on a downward side of the coupler placement portion 352B, a support bracket attachment hole 352d is formed.

The motor cover 353 according to the present embodiment is a cover member for internally storing the motor 354 by being integrated with the motor-housing portion 352A of the motor case 352, and is gently curved in such a manner as to be matched to the yoke outer shape of the motor 354. At a center portion in the vicinity of one side of the motor cover 353, a motor cover side latching claw 353a is provided in a projecting manner, and, at the other side portion of the motor cover 353, motor cover side latching hooks 353b, 353b are provided in a projecting manner to be horizontally aligned. Moreover, at an upward portion, a motor cover side latching projection 353c is provided in an upward projecting manner.

The motor cover side latching claw 353a is hooked upon and fixed to a motor cover latching hole 352g of the motor case 352 (see FIG. 16), while the motor cover side latching hooks 353b, 353b are inserted into and engaged with motor cover second latching holes 352i, 352i formed in a side portion of the motor-housing portion 352A of the motor case 352. Moreover, in this embodiment, the motor cover side latching projection 353c is in contact with the vicinity of an upper side portion of the motor-housing portion 352A. These configurations allow the motor case 352 and the motor cover 353 to be fitted together, and in the interior thereof, a space in which the motor 354 is installed is formed.

The motor 354 is a so-called "vibration motor" made of a known unbalanced mass motor. To an output shaft head end part of this motor 354, a weight is attached in an unbalanced manner (which is an unbalanced mass), and the configuration is made such that, when the motor 354 is driven and an output shaft rotates, vibrations are generated due to the unbalanced center of gravity of the weight. As described above, the motor 354 is installed in the space enclosed by the motor-housing portion 352A of the motor case 352 and the motor cover 353.

Note that, since the office seat S' according the present embodiment is often used in a room which requires quietness, the motor 354 is preferably small-sized. In this case, to reduce output, a drive unit (a part at which a rotor is installed) of the motor 354 is reduced. Accordingly, to match the size of the existing motor case 352 and motor cover 353, a rotor portion cover 57 may be provided. In other words, favorably, the rotor portion cover 57 is placed in such a manner as to cover an outer side of a yoke portion in which a rotor and the like are installed, thereby filling a reduced volume of this part and closing a gap. The description on the coupler 55 according to the present embodiment, which has a similar configuration, is thus omitted. Moreover, in the present embodiment, different from the embodiments as described above according to which an axial direction is placed in the horizontal direction, the motor 354 has an axial direction in the upper and lower direction.

A method of assembling each of the members that is configured as described above is described. The motor 354 to which the rotor portion cover 57 is attached is stored in an interior space formed by combining the motor case 352 and the motor cover 353. This combination is attached to the support bracket 351, while the support bracket attachment hole 352d formed in the motor case 352 and the motor case attachment hole 3152 formed in the support bracket 351 are allowed to communicate with each other, by screwing the tapping screw N1 into these communication holes.

Then, while the drive unit attachment portion 321A and the spring nuts 56 are grasped between opposing side clamping portions 351d and the motor attachment surface portion 351A, the load-supporting portion side attachment holes 321a, spring nut holes 56a, and the clamping piece side attachment holes 3153 are allowed to communicate with each other, and the shoulder bolts N3 are screwed from these communication holes, whereby the support bracket 351 is attached to the back pan 320. On this occasion, the load-supporting portion-clamping pieces 351B passing through the through holes V31 are in such a state that the opposing side clamping portions 351d come around a surface on an opposite side, and, in this state, screwing is performed.

Next, with reference to FIGS. 16-20, a method of assembling the motor case 352, the motor cover 353, and the support bracket 351 is described. As illustrated in FIG. 16, the motor cover 353 is provided with the motor cover side latching hooks 353b, 353b, and these motor cover side latching hooks 353b, 353b are inserted into and engaged with the motor cover second latching holes 352i, 352i formed in the motor case 352. Moreover, at the same time, the motor cover side latching claw 353a is hooked upon and fixed to the motor cover latching hole 352g of the motor case 352.

Note that, in the vicinity of a center portion of the interior space of the motor case 352, a space separation wall G1 is formed in such a manner as to divide into two this interior space. At a free end side center portion of this G1, a shaft placement portion G11 that is cut out downward into a substantially U-shape is formed. As illustrated in FIG. 17, an opening width of this shaft placement portion G11 is formed to be such a width as to be capable of being engaged with a shaft placement space-forming projection 57b provided to the rotor portion cover 57, and blocking an opening portion of this shaft placement portion G11 by this shaft placement space-forming projection 57b allows a shaft placement space G2 to be formed. Note that, on a rotor side of the motor 354, in other words, at an inner wall portion of a space housing a side covered by the rotor portion cover 57, a plurality of ribs G3 are provided, and the rotor portion cover 57 is positioned by these plurality of ribs G3 to be housed. Then, at the same time, a rotating shaft of the motor 354 is placed at the shaft placement portion G11, while the opening portion of the shaft placement portion G11 is blocked by the shaft placement portion space-forming projection 57b provided to the rotor portion cover 57, and consequently, while the motor 354 is housed in the motor case 352, the rotating shaft is housed in the shaft placement space G2. Note that a wire feed-out hole 57a is formed in the rotor portion cover 57, and from this wire feed-out hole 57a, a connection wire for power source supply to the motor 354 is fed out.

Next, an embodiment in which an assembly of the motor case 352 and the motor cover 353 is attached to the support bracket 351 is described. As illustrated in FIG. 18, at a side sideways from a position with which the motor cover side latching projection 353c is in contact when the motor cover 353 is attached to the motor case 352, an upper slit G4 is formed. Moreover, similarly, sizes of the motor case 352 and the motor cover 353 are configured such that a lower slit G5 is formed at a lower side as well when the motor cover 353 is attached to the motor case 352. Note that, in FIG. 18, a portion occupied by the motor case 352 is shaded for facilitating recognition of the combination.

The motor case-latching portions 351e, 351e provided to the support bracket 351 are inserted into and engaged with these upper slit G4 and lower slit G5. Specifically, as illustrated in FIG. 19, the upper motor case-latching portion 351e is inserted into the upper slit G4, while the lower motor case-latching portion 351e is inserted into the lower slit G5. Then, in this state, the complex of the motor case 352 and the motor cover 353 is pivoted around a latching part toward a hollow arrow side of FIG. 19 to be pushed down toward a support bracket 351 side. Consequently, the motor case attachment hole 3152 formed in the fastening portion 351b and the support bracket attachment hole 352d formed in the motor case 352 are allowed to communicate with each other, and accordingly (see FIG. 15), these communication holes fasten the tapping screw N1. As thus configured, as illustrated in FIG. 20, the motor case-latching portions 351e, 351e are respectively engaged with these upper slit G4 and lower slit G5, and fastening is made by the tapping screw N1, whereby attachment to the support bracket 351 can be easily performed with rigidity.

Next, with reference to FIGS. 21-23, method of disposing the ECU 7 is briefly described. As illustrated in FIGS. 21 and 22, the ECU 7 is attached on a rear surface side (a surface opposite to a seating surface) of the cushion pan F21. In the present example, the ECU 7 and a battery 8 are stored in and fixed to a structure made of an ECU cover 71, a base member 72, and a cover member 73. As illustrated in FIG. 23, the ECU cover 71 is made of a housing recessed groove 71a having a channel-shaped cross section and pan attachment portions 71b, 71b extending outward from both end portions thereof in a flange-shaped manner. In this pan attachment portion 71b, pan attachment holes 171, 171 are formed. The base member 72 and the cover member 73 are frame bodies having a channel-shaped cross section, which are combined, thereby internally forming a space for storing the ECU 7. In this storage space, the battery 8 and the ECU 7 are stored while stacked. As this battery 8, a battery used for charging a smartphone and the like may be used. Thus, a combination of the base member 72 and the cover member 73 is stored inside the groove of the ECU cover 71 while the battery 8 and the ECU 7 are stored in the storage space, and, in this state, is fixed to the cushion pan F21 by the tapping screw N1 from the pan attachment holes 171 (four pieces in the present example) formed in the pan attachment portions 71b (two in the present example). Note that a light-emitting diode (LED) for electric display or the like may be mounted, illustration of which is omitted.

TABLE OF REFERENCE NUMERALS

S: vehicle seat
S': office seat
S1: seat back
S2: seat cushion
S3: headrest-securing portion
F: seat frame
F1: seat back frame (back part)
    16: upper frame
        16a: side surface portion
    15: side frame
        15a: side plate
        15b: front edge portion
        15c: back edge portion
    17: lower frame
J: slide mechanism
    J1: outer rail
    J2: inner rail
P: connection pipe
R: reclining mechanism
F2: seat cushion frame (seat part)
    25: cushion side frame
    26: pressure recieving member of seat cushion
    27: rod member
F21: cushion pan (seat part)
F3: leg portion
K1: cushion pad
K2: seat cover
20: pressure-receiving member (load-supporting portion)
320: back pan (back part, load-supporting portion)
    21A, 321A: drive unit attachment portion
        21a, 321a: load-supporting portion side attachment hole
        H: pressure-receiving member side attachment top surface
        V1: through hole
        23a, 23b: claw portion -continued

TABLE OF REFERENCE NUMERALS

W1: upper wire
W2: lower wire
U: alertness-maintaining device
5, 35: device drive unit (electric component)
    51, 351: support bracket (support member)
        51A, 351A: motor attachment surface portion (drive source attachment surface portion)
            51a: motor side clamping portion
                151: support bracket attachment hole
            51b, 351b: fastening portion
                152, 3152: motor case attachment hole
            51e, 351e: motor case-latching portion
        51B, 351B: load-supporting portion-clamping piece
            51c, 351c: extension portion
            51d, 351d: opposing side clamping portion
                153, 3513: clamping piece side attachment hole
    52, 252, 352: motor case
        52A, 152A, 352A: motor-housing portion
            52a, 152a: motor-housing portion top surface
            G1: space separation wall
                G11: shaft placement portion
            G2: shaft placement space
            G3: rib
        52B, 152B, 352B: coupler placement portion
            52b: upper end edge
            52c: coupler attachment hole
            52d, 352d: support bracket attachment hole
            52e: coupler connection wire lead-in hole
            52f: support bracket-latching edge
            52g, 352g: motor cover latching hole
            52h: support bracket side latching portion through hole
            152C: connection wire-fixing wall
            152D: side surface cover
    53, 353: motor cover
        53a, 353a: motor cover side latching claw
        53b, 353b: motor cover side latching hook
        353c: motor cover side latching projection
    G4: upper slit
    G5: lower slit
    54, 354: motor
    55: coupler
        55a: motor connection wire
    56: spring nut
        56a: spring nut hole
    57: rotor portion cover
        57a: wire feed-out hole
        57b: shaft placement space-forming projection
M: motor unit
6: electrical connection wire
    61: first connection wire
    62: second connection wire
    61a: curved portion
    62a: curved portion
7: ECU
    71: ECU cover
        71a: housing recessed groove
            71b: pan attachment portion
                171: pan attachment hole
    72: base member
    73: cover member
8: battery
9: respiration sensor
    9a: sensor
N1: tapping screw
N2: well nut
N3: shoulder bolt
T1, T2, T3: terminal
Q: connection wire-fixing member
V1, V31: through hole

What is claimed is:

1. A seat comprising:
a seat back;
a seat cushion that is connected to the seat back;
a sensor that is provided in the seat cushion; and
an electrical control unit that is connected to the sensor via an electrical connection wire,
wherein:
the seat cushion includes a pair of right and left cushion side frames and a plate-shaped pressure receiving member that interconnects front portions of the cushion side frames,
the electrical control unit is mounted below the plate-shaped pressure receiving member and disposed at a position that overlaps the sensor in a seat front and rear direction,
the electrical control unit is arranged in front of the sensor,
a rod member is provided at a rear of the electrical control unit adjacent thereto, the rod member interconnecting the cushion side frames, and
the electrical connection wire extends rearwards passing under the rod member.

2. The seat according to claim 1, wherein:
the electrical connection wire includes a curved portion, and
the curved portion of the electrical connection wire is arranged side by side with the electrical control unit in a seat width direction.

3. The seat according to claim 1, wherein:
the sensor is arranged at a center portion of the seat cushion in a seat width direction, and
the electrical control unit is arranged at a position offset from a center of the seat cushion to an outer side of the seat cushion in the seat width direction.

4. The seat according to claim 1, wherein:
the electrical control unit is arranged at a position offset from a center of the seat cushion to an outer side of the seat cushion in a seat width direction, and
the electrical connection wire is connected to a lateral face of the electrical control unit which is opposite the side to which the electrical control unit is offset.

5. The seat according to claim 4, wherein the electrical connection wire is arranged only on the side of the seat which is opposite the side to which the electrical control unit is offset.

6. The seat according to claim 4, wherein the electrical connection wire also extends towards a rear side of the seat cushion.

7. The seat according to claim 1, wherein:
the electrical connection wire is a first connection wire that is connected to the sensor, and
the seat further comprises a second connection wire that is connected to a drive unit provided in the seat back.

8. The seat according to claim 1, wherein:
the electrical connection wire is a first connection wire that is connected to the sensor, and
the seat further comprises a second connection wire that is connected to an electric component provided in the seat,
the first connection wire is arranged at a position that overlaps the electrical control unit in the seat front and rear direction, and
the second connection wire is arranged at a position that does not overlap the electrical control unit in the seat front and rear direction.

9. The seat according to claim 1, further comprising:
a cushion pad;
a seat cover; and
a headrest.

* * * * *